United States Patent
Sanders et al.

[19]

[11] Patent Number: 6,014,217
[45] Date of Patent: Jan. 11, 2000

[54] FIBER OPTIC GYROSCOPE SCATTERING ERROR REDUCTION

[75] Inventors: Glen Aaron Sanders, Scottsdale; Lee Kevin Strandjord, Glendale, both of Ariz.; Nick Anthony Demma, Minneapolis, Mich.

[73] Assignee: Honeywell, Inc., Minneapolis, Minn.

[21] Appl. No.: 07/785,387

[22] Filed: Oct. 30, 1991

[51] Int. Cl.$^7$ .................................................. G01B 09/02
[52] U.S. Cl. ............................................................. 356/350
[58] Field of Search ............................................. 356/350

[56] References Cited

U.S. PATENT DOCUMENTS

| | | | |
|---|---|---|---|
| 4,729,622 | 3/1988 | Pavlath | 350/350 X |
| 5,120,130 | 6/1992 | Bergh | 356/350 |

OTHER PUBLICATIONS

"Passive Ring Resonator Method for Sensitive Inertial Rotation Measurements in Geophysics and Relativity," G. Sanders et al, *Optical Letters*, vol. 6, No. 11, Nov. 1981, pp. 569–571.

"Effect of Rayleigh Backscattering in an Optical Passive Ring–Resonator Gyro," K. Iwatsuki et al, *Applied Optica*, vol. 23 (21), 1984, pp. 3916–3924.

"The Passive Resonator Fiber Optic Gyro and Comparison to the Interferometer Fiber Gyro," R. Carroll et al, *SPIE*, vol. 719, Fiber Optic Gyros: 10th Anniversary Conference, 1986, pp. 169–177.

"Backscatter and the Resonant Fiber–Optic Gyro Scale Factor," R. Carroll et al, *Journal of Lightwave Technology*, vol. 7, No. 12, Dec. 1989, pp. 1895–1900.

"Adjustment–Free Method to Eliminate the Noise Induced by the Backscattering in an Optical Passive Ring–Resonator Gyro," K. Hotate et al, *IEEE Photonics Technology Letters*, Fol. 2, No. 1, Jan. 1990, pp. 75–77.

"Experimental Developments in the RFOG," T. Kaiser et al, *SPIE*, vol. 1367, Fiber Optic and Laser Sensors VIII (1990), pp. 121–126.

"Drift Reduction in an Optical Passive Ring–Resonator Gyro," K. Hotate et al, presented at the Society of Photo–Optical Instrumentation Engineers 15th Anniversary for Fiber Optical Gyroscopes, Sep. 1991.

*Primary Examiner*—Mark Hellner
*Attorney, Agent, or Firm*—Albert K. Kau

[57] ABSTRACT

An error reducer for reducing rotation rate backscattering errors in a rotation sensor by adjusting amplitudes of bias phase modulators introduced phase changes or amplitudes of a backscatter phase modulator introduced phase change and bias phase modulator introduced phase changes.

34 Claims, 5 Drawing Sheets

FIBER OPTIC GYROSCOPE SCATTERING ERROR REDUCTION

BACKGROUND OF THE INVENTION

The present invention relates to fiber optic gyroscopes used for rotation sensing and, more particularly, to resonator fiber optic gyroscopes.

Fiber optic gyroscopes are an attractive means with which to sense rotation. They can be made quite small and still be constructed to withstand considerable mechanical shock, temperature change, and other environmental extremes. In the absence of moving parts, they can be nearly maintenance free, and they have the potential to become economical in cost. They can also be sensitive to low rotation rates that can be a problem in other kinds of optical gyroscopes.

There are various forms of optical inertial rotation sensors which use the well known Sagnac effect to detect rotation about a pertinent axis thereof. These include active optical gyroscopes having the gain medium contained in an optical cavity therein, such as the ring laser gyroscope, and passive optical gyroscopes without any gain medium in the primary optical path, such as the interferometric fiber optic gyroscope and the ring resonator fiber optic gyroscope. The avoidance of having the active medium along the primary optical path in the gyroscope eliminates some problems which are encountered in active gyroscopes such as low rotation rate lock-in, bias drift and some causes of scale factor variation.

Interferometric fiber optic gyroscopes typically employ a single spatial mode optical fiber of a substantial length formed into a coil, this substantial length of optical fiber being relatively costly. Resonator fiber optic gyroscopes, on the other hand, are constructed with relatively few turns of a single spatial mode optical fiber giving them the potential of being more economical than interferometric fiber optic gyroscopes. A resonator fiber optic gyroscope typically has three to fifty meters of optical fiber in its coil versus 100 to 2,000 meters of optical fiber in coils used in interferometric fiber optic gyroscopes. In addition, resonator fiber optic gyroscopes appear to have certain advantages in scale factor linearity and dynamic range.

In either type of passive gyroscope, these coils are part of a substantially closed optical path in which an electromagnetic wave, or light wave, is introduced and split into a pair of such waves, to propagate in opposite directions through the optical fiber coil to both ultimately impinge on a photodetector or photodetectors, a single photodetector for both waves in interferometric fiber optic gyroscopes and on corresponding ones of a pair of photodetectors in resonator fiber optic gyroscopes. Rotation about the sensing axis of the core of the coiled optical fiber in either direction provides an effective optical path length increase in one rotational direction and an effective optical path length decrease in the opposite rotational direction for one member of this pair of electromagnetic waves. The opposite result occurs for the remaining member of the pair of electromagnetic waves for such rotation. Such path length differences between the pair of electromagnetic waves introduce corresponding phase shifts between those waves in interferometric fiber optic gyroscopes, or corresponding different optical cavity effective optical path lengths for these waves in a resonator fiber optic gyroscope.

In this latter instance, one or more optical frequency shifters are used to each effectively adjust the frequency of a corresponding one of the pair of electromagnetic waves that circulate in opposite directions in the resonator fiber optic coil. This is accomplished through such a frequency shifter shifting the frequency of a corresponding input electromagnetic wave giving rise to the resonator electromagnetic wave of interest. As a result, through feedback arrangements, the frequencies of each member of the pair of electromagnetic waves can be kept in resonance with the effective optical path length that wave is experiencing in the resonator fiber optic coil. Hence, any frequency difference between these waves becomes a measure of the rotation rate experienced by the resonator fiber optic coil about the axis around which this coil has been positioned. In such resonances, each wave has the portions thereof that previously were introduced in the resonator coil and have not yet dissipated, and the portions thereof currently being introduced in the resonator coil, at a frequency such that they are all in phase with one another so they additively combine to provide a peak in the intensity of that wave in that resonator over a local range of frequencies.

The difference in frequency between the members of the pair of opposing electromagnetic waves in a resonant fiber optic gyroscope is desired to be constant when rotation conditions about the resonator optic fiber coil axis are unchanging thereby requiring that stable resonance conditions occur in that resonator in those circumstances. Furthermore, there are several advantages in achieving frequency shifting of the resonator electromagnetic waves by operating one or more integrated optics phase modulators for this purpose through each of which the corresponding input electromagnetic wave transmitted. These advantages involve economics, packaging volume, and performance. Obtaining a constant frequency difference between these resonator wave pair members using such a phase modulator requires that the phase modulator change phase in the form of a linear ramp since the derivative of phase with respect to time yields the frequency.

Because of the impossibility of having a phase modulator provide an infinite duration linear ramp with respect to time, a repetitive linear ramp with periodic resetting of the phase to a reference value must be used. The resulting sawtooth phase change waveform results in what is termed serrodyne phase modulation of those electromagnetic waves passing through the modulator.

Consider the known resonator fiber optical gyroscope system of FIG. 1. An optical cavity resonator, 10, formed by a continual path optical fiber is provided with an input directional coupler, 11, and an output directional optical coupler, 12. Resonator 10 is formed of a single spatial mode optical fiber which has two polarization eigenstates. Avoiding different optical path lengths for electromagnetic waves in each state is solved by thoroughly mixing the polarized waves in each state or, alternatively, permitting only one polarization eigenstate to effectively exist by use of a polarizer. In the first instance, such mixing is achieved by fabricating the resonator coil with two ends of a three to fifty meter length of such fiber spliced together so that the birefringence principal axes of the fiber are rotated 90° with respect to each other on opposite sides of a splice, 13. Alternatively, instead of a splice, block 13 can represent a polarizer. The resonator fiber is characterized by a loss coefficient, $\alpha$, and, if a splice is used, an average of the propagation constants for the principal birefringence axes, $\beta_o$, assuming an ideal 90° splice. If a polarizer is used, the propagation constant will be that of the optical path of the permitted eigenstate of the electromagnetic waves which includes the transmission axis of the polarizer assuming a sufficiently large extinction ratio characterizes its blocking axis.

Directional coupler 11 is fabricated by appropriately fusing together an input optical fiber, 14, with the optical fiber in resonator 10, the fibers being tapered as they come into the fused portion on either side of that portion. Directional coupler 11 provides a phase shift of $\pi/2$ between an input electromagnetic wave and the resulting electromagnetic wave at the resonator output thereof, the output wave further being characterized with respect to the input electromagnetic wave by a coupler coupling coefficient, $k_1$, and a coupler loss coefficient, $\gamma_1$. Directional coupler 11 has a suitable packaging arrangement thereabout.

Directional coupler 12 is constructed in generally the same manner as is directional coupler 11, but here an output optical fiber, 15, is fused to the optical fiber of resonator 10. Directional coupler 12 is characterized by a coupler coupling coefficient, $k_2$, and a coupler loss coefficient, $\gamma_2$.

The opposite ends of input optical fiber 14 are each connected to an integrated optics chip, 16, formed with lithium niobate ($LiNbO_3$) as the base material therefor. These ends of fiber 14 are appropriately coupled to integrated optical waveguides, 17 and 18, formed in the base material of optical integrated circuit 16. The relationship of the ends of input optical fiber 14 and the ends of integrated waveguides 17 and 18 are such that electromagnetic waves can be efficiently passed therebetween without undue losses. Integrated waveguide 17 is provided between a pair of metal plates formed on the base material of optical integrated circuit 16 to provide a phase modulator, 19, therein. Similarly, integrated waveguide 18 is formed between a another pair of metal plates formed on the base material to result in a further phase modulator, 20, in optical integrated circuit 16. Integrated waveguides 17 and 18 merge with one another into a single integrated waveguide, 21, to thereby provide a "Y" coupler in optical integrated circuit 16.

A laser, 22, is coupled to integrated waveguide 21 in a suitable manner so that light may be transmitted efficiently from laser 22 to integrated waveguide 21. Laser 22 is typically a solid state laser emitting electromagnetic radiation having a wavelength of 1.3 $\mu$m with a spectral line width of one to hundreds of Khz. The wavelength at which laser 22 operates, or the frequency thereof, $f_o$, can be adjusted by signals at an input thereof. Typical ways of providing such adjustment is to control the temperature of, or the current through, the solid state laser, or through the "pumping" semiconductor light emitting diode for the solid state laser, which in the latter instance may be a Nd:Yag laser. Where the diode is the emitting laser, the laser type may be an external cavity laser, a distributed feedback laser or other suitable types.

Thus, electromagnetic radiation emitted by laser 22 at a variable frequency $f_o$ is coupled to integrated waveguide 21, and from there split into two portions to form a pair of electromagnetic waves traveling in the input optical path in directions opposite one another. That is, the electromagnetic wave portion transmitted through integrated waveguide 17 proceeds therethrough and past phase modulator 19 into input optical fiber 14, and through input directional coupler 11 where a fraction $k_1$ is continually coupled into resonator 10 to repeatedly travel therearound in a first direction, the counterclockwise direction, there being a continual fractional loss for that wave of $\gamma_1$ in coupler 11 as indicated above. The remaining portion of that wave, neither entering resonator 10 nor lost in coupler 11, continues to travel along input optical fiber 14 into integrated optical waveguide 18, through phase modulator 20, and finally through integrated waveguide 21 returning toward laser 22. Usually, laser 22 contains an isolator to prevent such returning waves from reaching the lasing portion thereof so that its properties are unaffected by those returning waves.

Similarly, the electromagnetic wave portion from laser 22, entering integrated waveguide 21 to begin in integrated waveguide 18, passes through phase modulator 20 into input optical fiber 14 and input directional coupler 11 where a fraction $k_1$ thereof is continually coupled into resonator 10, accompanied by a continual fractional loss of $\gamma_1$, to repeatedly traverse resonator 10 in a direction opposite (clockwise) to that traversed by the first portion coupled into resonator 10 described above. The remaining portion not coupled into resonator 10, and not lost in directional coupler 11, continues through input optical fiber 14 into integrated waveguide 17, passing through phase modulator 19, to again travel in integrated waveguide 21 in the opposite direction on its return toward laser 22.

The pair of opposite direction traveling electromagnetic waves in resonator 10, a clockwise wave and a counterclockwise wave, each have a fraction $k_2$ continually coupled into output optical fiber 15 with a fraction $\gamma_2$ of each continually lost in coupler 12. The counterclockwise wave is transmitted by coupler 12 and fiber 15 to a corresponding photodetector, 23, and the clockwise wave is transmitted by them to a corresponding photodetector, 24, these photodetectors being positioned at opposite ends of output optical fiber 15. Photodetectors 23 and 24 are typically p-i-n photodiodes each of which is connected in corresponding one of a pair of bias and amplifying circuits, 25 and 26, respectively.

The frequency of the electromagnetic radiation emitted by laser 22, after being split from its combined form in integrated waveguide 21 into separate portions in integrated waveguides 17 and 18, has a resulting portion thereof shifted from frequency $f_o$ to a corresponding resonance frequency by a serrodyne waveform applied to phase modulator 19. The portion of the electromagnetic wave diverted into integrated waveguide 17 is shifted from frequency $f_o$ to frequency $f_o+f_1$ by phase modulator 19, and this frequency shifted electromagnetic wave is then coupled by input directional coupler 11 into resonator 10 as the counterclockwise electromagnetic wave. However, the portion of the electromagnetic wave directed into integrated waveguide 18 from integrated waveguide 21 is not shifted in frequency in the system of FIG. 1, although the frequency thereof could alternatively be similarly shifted from $f_o$ to $f_o+f_2$ by phase modulator 20 in forming the clockwise wave in coil 10. This arrangement would permit having to measure just differences in frequencies between the two serrodyne generators used in such an arrangement to obtain a system output signal rather than the absolute frequency value of a single generator which may be more convenient in some circumstances. The shifting of frequency of the wave in integrated waveguide 17 is caused by a serrodyne waveform applied to phase modulator 19 as indicated above, the serrodyne waveform for phase modulator 19 being supplied from a controlled serrodyne generator, 27. A similar serrodyne waveform would be applied to modulator 20 by a fixed frequency serrodyne generator if the wave in waveguide 18 was chosen to also be shifted in frequency.

Thus, controlled serrodyne generator 27 provides a sawtooth waveform output signal having a repetitive linear ramp variable frequency $f_1$, the frequency $f_1$ of this sawtooth waveform being controlled by an input shown on the upper side of generator 27 in FIG. 1. The repetitive linear ramp frequency of a sawtooth waveform from another serrodyne generator, if chosen as part of the control for modulator 20, would be fixed as indicated above, and held at a constant value, $f_2$.

Structural detail of controlled serrodyne generator 27 is shown within the dashed line box representing that generator in FIG. 1 as three further blocks. The frequency control input of generator 27 is the input of a voltage-to-frequency converter, 27'. The frequency of the output signal of converter 27', proportional to the voltage at its input, sets the rate of count accumulation in a counter, 27", to which the output of converter 27' is connected. The output count totals of counter 27" are provided to a digital-to-analog converter, 27''', to form a "staircase" waveform to approximate the linear "ramps" occurring in a true serrodyne waveform.

The clockwise electromagnetic wave in resonator 10 and the counterclockwise electromagnetic wave in resonator 10 must always have the frequencies thereof driven toward values causing these waves to be in resonance in resonator 10 for the effective optical path length each is experiencing. This includes the path length variation resulting from any rotation of resonator 10 about the symmetrical axis thereof that is substantially perpendicular to the plane of the loop forming that optical resonator. Since controlled serrodyne generator 27 has the frequency of its serrodyne waveform controlled externally, that frequency value can be adjusted to the point that the corresponding counterclockwise wave in resonator 10 is in resonance with its effective path length, at least in a steady state situation. There, of course, can be transient effects not reflecting resonance in situations of sufficiently rapid changes of rotation rates of resonator 10.

On the other hand, the absence of a sawtooth waveform from another serrodyne generator to form part of the control of modulator 20 as shown in FIG. 1, or the use of a constant frequency for the sawtooth waveform of another serrodyne generator alternatively chosen to form part of the control of modulator 20, requires that the clockwise electromagnetic wave in resonator 10 be adjusted by other means. The means chosen in FIG. 1 is adjusting the frequency value of the light in laser 22. Thus, the adjustment of the value of the frequency $f_1$ of the sawtooth waveform of controlled serrodyne generator 27 can be accomplished independently of the adjustment of the frequency $f_o$ of laser 22 so that, in steady state situations, both the counterclockwise electromagnetic wave and the clockwise electromagnetic wave in resonator 10 can be in resonance therein despite each experiencing a different effective optical path length therein.

Adjusting the frequency of the counter-clockwise and clockwise electromagnetic waves traveling in opposite directions in resonator 10 means adjusting the frequency of each of these waves so that they are operating at the center of one of the peaks in the corresponding intensity spectra for resonator 10 experienced by such waves. Maintaining the frequency of the counterclockwise and the clockwise waves at the center of a corresponding resonance peak in the corresponding one of the resonator intensity spectra would be a difficult matter if that peak had to be estimated directly without providing some additional indicator of just where the center of the resonance peak actually is. Thus, the system of FIG. 1 introduces a bias modulation with respect to each of the counterclockwise and clockwise waves in resonator 10 through phase modulators 19 and 20, respectively. Such a bias modulation of each of these waves is used in a corresponding feedback loop to provide a loop discriminant characteristic followed by a signal therein which is acted on by that loop to adjust frequency $f_o$ and $f_1$ as necessary to maintain resonance of the clockwise and counterclockwise waves, respectively.

A bias modulation generator, 28, provides a sinusoidal signal at a frequency $f_m$ to directly control modulator 20. Similarly, a further bias modulation generator, 29, provides a sinusoidal waveform of a frequency $f_n$ which is added to the sawtooth waveform at frequency $f_1$ provided by serrodyne generator 27. Frequencies $f_m$ and $f_n$ differ from one another to reduce the effects of electromagnetic wave backscattering in the optical fiber of resonator 10 as will be shown below. The sinusoidal signal provided by bias modulation generator 28 is supplied to a summer, 30. A further generator signal is added to summer 30 as will be described below. The addition of the sinusoidal signal provided by bias modulator generator 29 to the sawtooth waveform provided by serrodyne generator 27 is accomplished in a further summer, 31.

The sinusoidal waveform provided at the output of summer 30 in the absence of any contribution thereto other than from bias modulation generator 28 is amplified in a power amplifier, 32, which is used to provide sufficient voltage to operate phase modulator 20. Similarly, the combined output signal provided by summer 31 is provided to the input of a further power amplifier, 33, used to provide sufficient voltage to operate phase modulator 19.

In this arrangement, the input electromagnetic wave to resonator 10 from integrated waveguide 17 will have an instantaneous electric field frequency of:

$$f_o + f_1 - f_n \Delta\phi_n \sin \omega_n t$$

where $\Delta\phi_n$ is the amplitude of the bias modulation phase change at frequency $f_n$. The fraction of the electromagnetic wave reaching photodetector 23 through resonator 10 is not only shifted in frequency to a value of $f_o + f_1$, but is also effectively frequency modulated at $f_n$. Depending on the difference between the resonance frequency and $f_o + f_1$, the intensity at that photodetector will thus have variations occurring therein at integer multiples of $f_n$ (though the fundamental and odd harmonics thereof will not occur at exact resonance). These latter components have amplitude factors related to the deviation occurring in the sum of (a) the phase shift resulting from the propagation constant multiplied by the path length in the counterclockwise direction in resonator 10, plus (b) phase shifts due to rotation and other sources, from a value equaling an integer multiple of $2\pi$, a condition necessary for resonance along the effective optical path length in this direction.

The electromagnetic wave in integrated waveguide 18 enroute to resonator 10 will have instantaneous frequency equal to:

$$f_o - f_m \Delta\phi_m \sin \omega_m t,$$

in the absence of a signal supplied to summer 30 other than from bias modulation generator 28. Here, $\Delta\phi_m$ is the amplitude of the bias modulation phase change at frequency $f_m$. The fraction thereof reaching photodetector 24 through resonator 10 is at a frequency value in this instance of $f_o$ and frequency modulated at $f_m$, again absent any other signal being supplied to summer 30 than that of bias modulation generator 28. Again, the intensity at photodetector 24 will have variations therein at integer multiples of $f_m$, though not at the fundamental and odd harmonics thereof if these clockwise waves are at exact resonance. These latter components also have amplitude factors related to the deviation of the sum of (a) the phase shift resulting from the propagation constant multiplied by the path length in the clockwise direction in resonator 10, plus (b) phase shifts due to rotation and other sources, from a value equaling an integer multiple of $2\pi$, again, a condition necessary for resonance along the effective optical path length in that direction.

Since the output signal of photodetector 24 has a frequency component at $f_m$ that is a measure of the deviation from resonance in resonator 10 in the clockwise direction, the output signal of bias and amplifier photodetector circuit 26 is provided to a filter, 34, capable of passing signal portions having a frequency component $f_m$. Similarly, the output signal of photodetector 23 has a frequency component at $f_n$ that is a measure of the deviation from resonance in the counterclockwise direction, and so a filter, 35, is provided at the output of photodetector bias and amplifier circuit 25 capable of passing signal components having a frequency of $f_n$.

The output signal from filter 34 is then provided to a phase detector, 36, at an operating signal input thereof. Phase detector 36 is a phase sensitive detector which also receives, at a demodulation signal input thereof, the output signal of bias modulation generator 28 which is the sinusoidal signal at frequency $f_m$. Similarly, the output signal from filter 35 is provided to an operating signal input of a further phase detector, 37, which also receives at a demodulation input thereof the output sinusoidal signal at frequency $f_n$ of bias modulation generator 29. The output signals of phase detectors 36 and 37 follow a loop discriminant characteristic so that they indicate how far from resonance are the corresponding frequencies in resonator 10.

The discriminant characteristic followed by the output of phase detectors 36 and 37 will change algebraic sign for the frequencies on either side of the resonance peak and will have a zero magnitude at the resonance peak or resonance center. In fact, for sufficiently small values of the bias modulation generator output signals, the characteristic followed by the output signals of phase detectors 36 and 37 will be close to the derivative with respect to frequency of the intensity spectrum near the corresponding resonance peak. Thus, the output characteristics followed by the output signals of phase detectors 36 and 37 provide signals well suited for a feedback loop used to adjust frequencies to keep the corresponding electromagnetic waves in resonance in resonator 10.

Errors in the feedback loop are to be eliminated, and so the output signal of phase detector 36 is supplied to an integrator, 38, and the output signal of phase detector 37 is supplied to a further integrator, 39. Deviations from resonance are stored in these integrators which are then used in the loop to force the waves back to resonance in resonator 10. The output signal of integrator 38, in turn, is supplied to an amplifier, 40, used to provide signals to laser 22 to control the frequency $f_o$ of light being emitted by laser 22, thereby closing the feedback loop for adjusting that frequency. Similarly, the output signal of integrator 39 is supplied to an amplifier, 41, which in turn has its outputs supplied to the modulation input of controlled serrodyne generator 27, thus completing the remaining feedback loop to be used for adjusting serrodyne frequency $f_1$.

However, certain errors can arise because of the effects of the propagation characteristics of resonator 10 on the electromagnetic waves oppositely propagating therein which lead to frequency differences therebetween that appear as though they were induced by rotations of resonator 10 about its axis of symmetry perpendicular to the plane in which it is positioned. One source of such error is the backscattering of the electromagnetic wave propagating in the optical fiber material (primarily fused silica glass) in resonator 10.

The structure of the fused silica glass in the optical fiber used in resonator coil 10 has been found to have fluctuations in the refractive index therealong, and to sometimes have impurities or minute cracks therein. Incidence of an electromagnetic wave on such inhomogeneities leads to portions of that wave being reflected to travel in the opposite direction in resonator coil 10, with the remainder of the wave continuing in the original direction in resonator coil 10. Thus, the effect on the electric field of the incident electromagnetic wave is to create a wave traveling in the opposite direction having a magnitude and phase related to the original wave by $\eta e^{i\phi}$ where $\eta$ is the fraction of the original wave reflected backward and $\phi$ is the phase relationship of this backward wave with respect to the phase of the original wave. This backward traveling wave can combine with the counterpropagating electromagnetic wave opposing the original electromagnetic wave leading to resulting errors in the apparent frequency difference between these counterpropagating electromagnetic waves in resonator coil 10 which is the basis of the gyroscope output signal.

As indicated above, one means for reducing the resulting error is the use of different frequencies for bias modulation generators 28 and 29. Since the feedback loops leading from photodetectors 23 and 24 select the error signal therefor at just a single frequency corresponding to the frequency of its associated bias modulation generator, a potential output error component due to backscattering will be avoided if the feedback loop selected frequency differs from that provided in the other feedback loop as will be shown below. The use of an added backscatter reduction modulation generator, 50, introducing its output signal into summer 30 to join bias modulation generator 28 in operating phase modulator 20, will reduce substantially further an output error component if operated at yet another frequency, $f_j$, if chosen to cause a proper resulting phase change amplitude as will also be shown below. This choice is made by appropriately setting an amplitude adjuster, 51, to adjust the output signal amplitude of generator 50. With the addition of generator 50, electromagnetic waves in integrated waveguide 18 enroute to resonator 10 will now have an effective instantaneous frequency equal to:

$$f_o - f_m \Delta\phi_m \sin \omega_m t - f_j \Delta\phi_j \sin \omega_j t$$

where $\Delta\phi_j$ is the amplitude of the backscatter reduction modulation phase change at frequency $f_j$. Because of the pervasiveness of backscattering sites in the optical fiber of resonator coil 10, output errors can be quite substantial, even dominating, in the absence of measures to control the magnitude thereof.

The nature of such errors arising because of the occurrence of backscattering initiation sites in resonator coil 10 can be found using a suitable representation for these waves propagating therein. One such representation that can be shown to be suitable for the counterclockwise wave is given as:

$$E_{ccw-d}(t) = -pE_{in}e^{i(\omega_o+\omega_1)t}e^{-i\beta_{o-1}l_1}\sqrt{k_1}\sqrt{k_2}\sqrt{1-\gamma_1}\sqrt{1-\gamma_2} \times$$

$$e^{-i(\beta_{o-1}l_{17}-\Delta\phi_n\cos\omega_n t+\Delta\beta_n l_1\sin\omega_n t)}\sum_{u=1}^{\infty}[Re^{i(\phi_r+\theta)}e^{-i\beta_{ccw}L}]^u -$$

$$qE_{in}e^{i\omega_o t}e^{-i\beta_o(l_1+2l_3)}\sqrt{k_1}\sqrt{k_2}\sqrt{1-\gamma_1}\sqrt{1-\gamma_2}\sqrt{1-k_1}\sqrt{1-\gamma_1}\,\eta_1 e^{i\varphi} \times$$

$$\left\{e^{-i[\beta_o l_{18}-\Delta\phi_m\cos\omega_m t+\Delta\beta_m(l_1+2l_3)\sin\omega_m t-\Delta\phi_j\cos\omega_j t]}\times\sum_{u=1}^{\infty}[Re^{i(\phi_r+\theta)}e^{-i\beta_{cw}L}]^u + \right.$$

$$Re^{-i\beta_o L}e^{-i[\beta_o l_{18}-\Delta\phi_m\cos\omega_m t+\Delta\beta_m(l_1+2l_3)\sin\omega_m t-\Delta\beta_m L\sin\omega_m t]} \times$$

$$e^{-i(-\Delta\phi_j\cos\omega_j t-\Delta\beta_j L\sin\omega_j t)}e^{-i(\phi_r-\theta)}\sum_{u=1}^{\infty}[Re^{i(\phi_r+\theta)}e^{-i\beta_{cw}L}]^u +$$

$$R^2 e^{-i2\beta_o L}e^{-i[\beta_o l_{18}-\Delta\phi_m\cos\omega_m t+\Delta\beta_m(l_1+2l_3)\sin\omega_m t-\Delta\beta_m 2L\sin\omega_m t]} \times$$

$$e^{-i(-\Delta\phi_j\cos\omega_j t-\Delta\beta_j 2L\sin\omega_j t)}e^{-i2(\phi_r-\theta)}\sum_{u=1}^{\infty}[Re^{i(\phi_r+\theta)}e^{-i\beta_{cw}L}]^u +$$

$$\vdots$$

$$R^v e^{-iv\beta_o L}e^{-i[\beta_o l_{18}-\Delta\phi_m\cos\omega_m t+\Delta\beta_m(l_1+2l_3)\sin\omega_m t-\Delta\beta_m vL\sin\omega_m t]} \times$$

$$e^{-i(-\Delta\phi_j\cos\omega_j t-\Delta\beta_j vL\sin\omega_j t)}e^{-iv(\phi_r-\theta)}\sum_{u=1}^{\infty}[Re^{i(\phi_r+\theta)}e^{-i\beta_{cw}L}]^u +$$

$$\cdots$$

$$\left.\vdots + \cdots\right\}$$

Resonator 10 in FIG. 1 for purposes of this equation has had its extent between couplers 11 and 12 through block 13, which does not contain therein the selected scattering site example for this equation, designated as having a length $l_1$. The extent between coupler 12 and the selected scattering site example location on the other side of coil 10 is designated as having a length $l_2$, and the remaining extent of resonator 10 is designated as having a length $l_3$. In total, L $\triangleq l_1+l_2+l_3$. In these length assignments, couplers 11 and 12 are assumed to have no significant extent along the optical path in resonator 10, with a similar assumption for block 13.

The distances $l_{17}$ and $l_{18}$ in this last equation represent the distances from the "Y" coupler junction to the input of coupler 11 along integrated waveguides 17 and 18, respectively, and input optical fiber 14. The constant p is the fraction of the input electromagnetic field $E_{in}$ of the input electromagnetic wave from laser 22 into single integrated waveguide 21 which reaches input coupler 11 after the "Y" coupler is split to integrated waveguide branch 17 including the losses occurring therealong. The constant q serves in the same capacity for purposes of integrated waveguide 18.

The constant R in this last equation has a value defined as:

$$R \triangleq \sqrt{1-k_1}\sqrt{1-k_2}\sqrt{1-\gamma_1}\sqrt{1-\gamma_2}\,e^{-\alpha\frac{L}{2}}$$

where the coefficient $\alpha$ is the coefficient giving the loss per unit length in the resonator optical fiber of coil. The parameter $\phi_r$ represents the Sagnac phase shift induced by rotation about the axis thereof perpendicular to the planes in which that coil is formed. The parameter $\theta$ is for a splice rather than a polarizer in block 13, and $-\theta$ represents the change in optical phase due to such a splice 13, ideally 90°. The parameter u is a counting parameter for the number of circulations about coil 10 by the inserted electromagnetic waves.

There are two major terms in the equation for $E_{ccw-d}$, the first of which is multiplied by the factor p and the second of which is multiplied by the factor q. The term multiplied by the factor p represents the electric field of the electromagnetic wave from laser 22 along integrated waveguide 17 coupled through input coupler 11 into resonator coil 10, and there repeatedly traveling in the counterclockwise direction around resonator coil 10 with a fraction coupled out of output coupler 12 to photodetector 23.

The argument of the last exponential preceding the summation sign in this term having the factor p, $\beta_{o-1}l_{17}-\Delta\phi_n \cos \omega_n t+\Delta\beta_n l_1 \sin \omega_n t$, represents the phase change along the optical path in integrated waveguide 17 and input optical fiber 14 further shifted in phase to account for the transmission to photodetector 23, and includes the effects of modulation at frequency $f_n$. The argument of the exponential immediately preceding the exponential just referred to, $\beta_{o-1}l_1$, and the argument of the second exponential in the summation terms, $\beta_{ccw}L$ represents the further phase change which occurs in resonator coil 10 on the way to photodetector 23, and depends on the number of times that an output coupled portion is recirculated in resonator 10 before being coupled by output coupler 12 to photodetector 23. This resonator phase change is again shifted in phase to account for the propagation time to photodetector 23, and again reflects the effects of modulation at frequency $f_n$.

The effective propagation "constant" in the counterclockwise direction in resonator 10, $\beta_{ccw}$, gives the effective phase change per unit length along coil 10, and comprises a pair of terms, that is $\beta_{ccw} = \beta_{o-1} - \Delta\beta_n \sin \omega_n t$. The term $\beta_{0-1} = 2\pi n_{eff}$ $(f_o + f_1)/c$ is the weighted average of the propagation constants of the two principal axes of birefringence of the optical fiber in resonator 10 if a splice 13 has been used. This average is based on the fraction of travel over each axis by the electromagnetic waves in the resonator in the corresponding polarization state with changes between axes being due to the 90° rotation splice in the optical fiber of that resonator as described above. A rotation of other than 90° will give an uneven weighting to these axes. If, on the other hand, a polarizer is used rather than a splice at block 13, there will only be a single propagation constant as $n_{eff}$ will no longer be an average of indices of refraction but a single value index of refraction (ignoring other index refraction issues). Again, the parameter $\theta$ in the above equations for $E_{ccw-d}$ reflects any added phase due to the 90° splice, or near 90° splice, involving block 13, if present, rather than a polarizer.

The parameter $\Delta\beta_n = 2\pi n_{eff} f_n \Delta\phi_n / c$ is the equivalent change in the effective propagation constant due to the incoming electromagnetic waves having been modulated sinusoidally at the rate $\omega_n$ with a peak amplitude change of $\Delta\phi_n$. Of course, $\omega_o = 2\pi f_o$, and is the frequency of oscillation in the electromagnetic wave provided by laser 22. Similarly, $\omega_1 = 2\pi f_1$, and is the frequency of oscillation of controlled serrodyne generator 27 used to adjust the effective frequency of the electromagnetic wave reaching input coupler 11 from laser 22 along integrated waveguide 17 in input optical coupler 14.

The second major term in the equation given above for $E_{ccw-d}$, having the factor q therein, represents the electromagnetic waves emitted by laser 22 into waveguide 21 which then are coupled at the "Y" coupler junction into integrated waveguide branch 18 and optical fiber 14 to reach input coupler 11. Once there and coupled into resonator 10 to propagate in the clockwise direction, those waves encounter the selected scattering site example used as the basis of the above equation for $E_{ccw-d}$. As a result, a portion of such a clockwise wave $\eta_1$ is reversed in direction to then propagate in the counterclockwise direction with a phase shift of $\phi$ with respect to its phase on reaching the example scattering site.

Some of the incident clockwise waves will encounter the example scattering site on the first trip in the clockwise direction around resonator coil 10, and others will be scattered during one of the succeeding circulations of the clockwise wave around resonator coil 10. Once scattered into the counterclockwise direction, such scattered waves are assumed to continue in that direction in the equation given above for $E_{ccw-d}$ although, of course, some portion of them will be rescattered and again travel in the clockwise direction. However, such portions will be so small because of the relatively small value of $\eta_1$ that they can be ignored. That approximation, and other appropriate approximations, are used in reaching the expression given above for $E_{ccw-d}$ where the result of such use makes no significant difference in representing the outcome of the system shown in FIG. 1.

The exponential terms inside the braces with time dependent arguments again represent the phase change of the waves from source 22 to coupler 11 shifted to account for the transmission to photodetector 23 via reflection from the example scattering site, and include the modulation effects at frequencies $f_m$ and $f_j$. The exponential having the length factor $l_1 + 2l_3$ outside the brackets, and the second exponential in each of the summation terms inside the brackets, represent the further phase shifts occurring in resonator 10 shifted again to account for arrival at photodetector 23, and which again include modulation effects at frequencies $f_m$ and $f_j$ for the electromagnetic waves recirculating in resonator 10 before being coupled by output coupler 12 to photodetector 23.

The effect of propagation "constant" in the clockwise direction, $\beta_{cw}$, for the duration of propagation in that direction gives the effective phase change per unit of length along coil 10 in that direction, and differs from $\beta_{ccw}$ because of the absence of any controlled serrodyne generator signal being delivered to phase modulator 20, and because of the addition of the signal of backscatter reduction modulation generator 50 being added to phase modulator 20. As a result, $\beta_{cw} = \beta_o - \Delta\beta_m \sin \omega_m t - \Delta\beta_j \sin \omega_j t$. The term $\beta_o = 2\pi n_{eff} f_o / c$ is again the weighted average of the propagation constants of the two principal axes of birefringence of the optical fiber in resonator 10 if a splice 13 has been used. Otherwise, there will only be the single propagation constant involved as $n_{eff}$ will no longer be an average of indices of refraction but a single value index of refraction (again ignoring other index of refraction issues).

The parameter $\Delta\beta_m = 2\pi n_{eff} f_m \Delta\phi_m / c$ is the equivalent change in the effective propagation constant due to the incoming electromagnetic waves having been modulated sinusoidally at the rate of $\omega_m$ with a peak amplitude change of $\Delta\phi_m$. Similarly, the parameter $\Delta\beta_j = 2\pi n_{eff} f_j \Delta\phi_j / c$ is the equivalent change in the effective propagation constant due to the incoming electromagnetic waves having been modulated sinusoidally at a rate $\omega_j$ with a peak amplitude change of $\phi_j$.

Although this equation for $E_{ccw-d}$ is indeed just for the counterclockwise traveling electromagnetic wave in resonator 10 reaching photodetector 23 that began either in integrated optical waveguide 17, or began in integrated optical waveguide 18 to be scattered into the counterclockwise direction, the counterpart equation for the clockwise wave reaching photodetector 24 will be quite similar. Such a counterpart equation will be for waves beginning in integrated optical waveguide 18 and traveling in the opposite, or counterclockwise, direction in resonator 10, and the waves beginning in integrated waveguide 17 which are scattered to change from the counterclockwise direction to the clockwise direction. The resulting clockwise waves will, however, have the opposite sign for any rotation induced phase shift.

Of course, the positions in such an equation of the effective propagation "constants" $\beta_{ccw}$ and $\beta_{cw}$ will be reversed, the positions of the lengths $l_{17}$ and $l_{18}$ will be reversed, as will the positions of $\omega_o$ and $\omega_o + \omega_1$, the positions of q and p, and the positions of $\beta_o$ and $\beta_{o-1}$. Since there can be a difference in the scattering results for incidences of electromagnetic waves from opposite directions at the same scattering site, $\eta_2$ will replace $\eta_1$. The factor multiplying $qE_{in}$ will have $\sqrt{1-k_2} \sqrt{1-\gamma_2}$ instead of $\sqrt{1-k_1} \sqrt{1-\gamma_1}$. The length factor in exponential arguments $l_1 + 2l_3$ will be changed to $l_1 + 2l_2$ as $l_3$ will be replaced by $l_2$. The return scattering path will be over $l_2$ rather than $l_3$. Also, the subscripts m and n will be substituted one for the other, and there will be other changes in the arguments of the exponentials.

In general, however, there will be substantial similarity in the corresponding equation for $E_{cw-d}(t)$ and the equation given above for $E_{ccw-d}(t)$, as can be seen from that equation $$E_{cw-d}(t) = qE_{in}e^{i(\omega_o)t}e^{-i\beta_{o-1}(l_2+l_3)}\sqrt{k_1}\sqrt{k_2}\sqrt{1-\gamma_1}\sqrt{1-\gamma_2} \times$$

$$e^{-i(\beta_o l_{18} - \Delta\phi_m \cos\omega_m t + \Delta\phi_j \cos\omega_j t + \Delta\beta_m(l_2+l_3)\sin\omega_m t)}\sum_{u=1}^{\infty}[Re^{i(-\phi_r+\theta)}e^{-i\beta_{cw}L}]^u -$$

$$pE_{in}e^{i(\omega_o+\omega_1)t}e^{-i\beta_{o-1}(l_1+2l_2)}\sqrt{k_1}\sqrt{k_2}\sqrt{1-\gamma_1}\sqrt{1-\gamma_2}\sqrt{1-k_2}\sqrt{1-\gamma_2}\eta_2 e^{i\varphi} \times$$

$$\left\{ e^{-i[\beta_{o-1}l_{17}-\Delta\phi_n\cos\omega_n t+\Delta\beta_n(l_1+2l_2)\sin\omega_n t]} \times \sum_{u=1}^{\infty}[Re^{i(-\phi_r+\theta)}e^{-i\beta_{cw}L}]^u + \right.$$

$$Re^{-i\beta_{o-1}L}e^{-i[\beta_{o-1}l_{17}-\Delta\phi_n\cos\omega_n t+\Delta\beta_n(l_1+2l_2)\sin\omega_n t-\Delta\beta_n L\sin\omega_n t]} \times$$

$$e^{i(\phi_r+\theta)}\sum_{u=1}^{\infty}[Re^{i(-\phi_r+\theta)}e^{-i\beta_{cw}L}]^u +$$

$$R^2 e^{-i2\beta_{o-1}L}e^{-i[\beta_{o-1}l_{17}-\Delta\phi_n\cos\omega_n t+\Delta\beta_n(l_1+2l_2)\sin\omega_n t-\Delta\beta_n 2L\sin\omega_n t]} \times$$

$$e^{i2(\phi_r+\theta)}\sum_{u=1}^{\infty}[Re^{i(-\phi_r+\theta)}e^{-i\beta_{cw}L}]^u +$$

$$\vdots$$

$$R^v e^{-iv\beta_{o-1}L}e^{-i[\beta_{o-1}l_{17}-\Delta\phi_n\cos\omega_n t+\Delta\beta_n(l_1+2l_2)\sin\omega_n t-\Delta\beta_n vL\sin\omega_n t]} \times$$

$$e^{iv(\phi_r+\theta)}\sum_{u=1}^{\infty}[Re^{i(-\phi_r+\theta)}e^{-i\beta_{cw}L}]^u +$$

$$\cdots$$

$$\left. \vdots + \cdots \right\}$$

In the following, the equation for $E_{ccw-d}(t)$ will be used primarily, but similar results can be obtained for $E_{cw-d}$.

The summations in the equation for $E_{ccw-d}(t)$ can be reduced to closed form using the well-known result for such geometric series. The result can be written:

$$E_{ccw-d}(t) = -pE_{in}e^{i(\omega_o+\omega_1)t}e^{-i\beta_{o-1}l_1}R'e^{-i(\beta_{o-1}l_{17}-\Delta\phi_n\cos\omega_n t+\Delta\beta_n l_1 \sin\omega_n t)} \times$$

$$\frac{1}{1-Re^{i(\phi_r+\theta)}e^{-i\beta_{ccw}L}} -$$

$$qE_{in}e^{i\omega_o t}e^{-i\beta_o(l_1+2l_3)}R'\sqrt{1-k_1}\sqrt{1-\gamma_1}\eta_1 e^{i\varphi} \times$$

$$e^{-i[\beta_o l_{18}-\Delta\phi_m \cos\omega_m t+\Delta\beta_m(l_1+2l_3)\sin\omega_m t-\Delta\phi_j \cos\omega_j t]} \times$$

-continued $$\frac{1}{1-Re^{i(\phi_r+\theta)}e^{-i\beta_{cw}L}}\frac{1}{1-Re^{-i(\phi_R-\theta)}e^{-i\beta_{cw}L}}$$

The constant $$R' \triangleq \sqrt{k_1}\sqrt{k_2}\sqrt{1-\gamma_1}\sqrt{1-\gamma_2}$$

has been defined for use in this result.

From the foregoing equation for $E_{ccw-d}$ giving the electric field of the counterclockwise waves impinging on photodetector 23, the intensity associated with such propagating electromagnetic waves received on photodetector 23, $I_{ccw-d}(t)$, can be found. Thus, $$I_{ccw-d}(t) = E_{ccw-d}(t) \cdot E^*_{ccw-d}(t)$$

$$= \frac{(R')^2|E_{in}|^2}{(1-R)^2 + 4R\sin^2\left(\frac{\phi_r+\theta-\beta_{ccw}L}{2}\right)} +$$

$$\frac{(R')^2|E_{in}|^2\eta_1^2(1-k_1)(1-\gamma_1)}{\left[(1-R^2)+4R\sin^2\left(\frac{\phi_r+\theta-\beta_{cw}L}{2}\right)\right]\left[(1-R)^2+4R\sin^2\left(\frac{-\phi_r+\theta-\beta_{cw}L}{2}\right)\right]} +$$

$$\frac{(R')^2|E_{in}|^2\eta_1\sqrt{1-k_1}\sqrt{1-\gamma_1}\,e^{i\psi}}{[1-Re^{i(\phi_r+\theta)}e^{-i\beta_{cw}L}][1-Re^{-i(\phi_r+\theta)}e^{i\beta_{cw}L}][1-Re^{i(\phi_r-\theta)}e^{i\beta_{cw}L}]} +$$

$$\frac{(R')^2|E_{in}|^2\eta_1\sqrt{1-k_1}\sqrt{1-\gamma_1}\,e^{-i\psi}}{[1-Re^{-i(\phi_r+\theta)}e^{i\beta_{cw}L}][1-Re^{i(\phi_r+\theta)}e^{-i\beta_{cw}L}][1-Re^{-i(\phi_r-\theta)}e^{-i\beta_{cw}L}]}$$

where

-continued
$$\psi \triangleq -[-\omega_1 t + \beta_{o-1} l_1 - \beta_o(l_1 + 2l_3) + \varphi + \beta_{o-1} l_{17} - \Delta\phi_n \cos\omega_n t + \Delta\beta_n l_1 \sin\omega_r -$$
$$\beta_o l_{18} + \Delta\phi_m \cos\omega_m t - \Delta\beta_m(l_1 + 2l_3)\sin\omega_m t + \Delta\phi_j \cos\omega_j t].$$

This result was obtained with the use of the well-known Euler equation and a trigonometric identity. If the last two terms in the equation for $I_{ccw-d}$ have both the numerator and denominator thereof multiplied by the complex conjugate of its denominator, the denominator will be real, and the imaginary part of each of those terms will be confined to the numerator thereof. This gives the result:

Using the Euler equation and noting that the sum of complex conjugates is equal to twice the real part of one of the summands, this last equation can be rewritten to remove the imaginary parts of the numerators of the last two terms to give:

$$I_{ccw-d}(t) = \frac{(R')^2 |E_{in}|^2}{(1-R)^2 + 4R\sin^2\left(\frac{\phi_r + \theta - \beta_{ccw}L}{2}\right)} +$$

$$\frac{(R')^2 |E_{in}|^2 \eta_1^2 (1-k_1)(1-\gamma_1)}{\left[(1-R)^2 + 4R\sin^2\left(\frac{\phi_r + \theta - \beta_{cw}L}{2}\right)\right]\left[(1-R)^2 + 4R\sin^2\left(\frac{-\phi_r + \theta - \beta_{cw}L}{2}\right)\right]} +$$

$$\frac{(R')^2 |E_{in}|^2 \eta_1 \sqrt{1-k_1} \sqrt{1-\gamma_1}}{\left[(1-R)^2 + 4R\sin^2\left(\frac{-\phi_r - \theta + \beta_{ccw}L}{2}\right)\right]\left[(1-R)^2 + 4R\sin^2\left(\frac{-\phi_r - \theta + \beta_{cw}L}{2}\right)\right]} \frac{[1 - Re^{-i(\phi_r+\theta)}e^{i\beta_{ccw}L}][1 - Re^{i(\phi_r+\theta)}e^{-i\beta_{cw}L}]}{} \times$$

$$\frac{[1 - Re^{-i(\phi_r-\theta)}e^{-i\beta_{cw}L}]e^{i\psi}}{\left[(1-R)^2 + 4R\sin^2\left(\frac{\phi_r - \theta + \beta_{cw}L}{2}\right)\right]} +$$

$$\frac{(R')^2 |E_{in}|^2 \eta_1 \sqrt{1-k_1} \sqrt{1-\gamma_1}}{\left[(1-R)^2 + 4R\sin^2\left(\frac{-\phi_r - \theta + \beta_{ccw}L}{2}\right)\right]\left[(1-R)^2 + 4R\sin^2\left(\frac{-\phi_r - \theta + \beta_{cw}L}{2}\right)\right]} \frac{[1 - Re^{i(\phi_r+\theta)}e^{-i\beta_{ccw}L}][1 - Re^{-i(\phi_r+\theta)}e^{i\beta_{cw}L}]}{} \times$$

$$\frac{[1 - Re^{i(\phi_r-\theta)}e^{i\beta_{cw}L}]e^{-i\psi}}{\left[(1-R)^2 + 4R\sin^2\left(\frac{\phi_r - \theta + \beta_{cw}L}{2}\right)\right]}$$

$$I_{ccw-d}(t) = \frac{(R')^2 |E_{in}|^2}{(1-R)^2 + 4R\sin^2\left(\frac{\phi_r + \theta - \beta_{ccw}L}{2}\right)} +$$

$$\frac{(R')^2 |E_{in}|^2 \eta_1^2 (1-k_1)(1-\gamma_1)}{\left[(1-R^2) + 4R\sin^2\left(\frac{\phi_r + \theta - \beta_{cw}L}{2}\right)\right]\left[(1-R)^2 + 4R\sin^2\left(\frac{-\phi_r + \theta - \beta_{cw}L}{2}\right)\right]} +$$

$$\frac{(R')^2 |E_{in}|^2 \eta_1 (1-k_1)(1-\gamma_1)}{\left[(1-R^2) + 4R\sin^2\left(\frac{-\phi_r - \theta + \beta_{cw}L}{2}\right)\right]\left[(1-R)^2 + 4R\sin^2\left(\frac{-\phi_r - \theta + \beta_{cw}L}{2}\right)\right]} \times$$

$$\frac{1}{\left[(1-R)^2 4R\sin^2\left(\frac{\phi_r - \theta + \beta_{cw}L}{2}\right)\right]} \times$$

$$\{2\cos\psi[1 - R\cos(\beta_{ccw}L - \phi_r - \theta) - R\cos(\beta_{cw}L - \phi_r - \theta) -$$
$$R\cos(\beta_{cw}L + \phi_r - \theta) + R^2\cos(\beta_{ccw}L - \beta_{cw}L) +$$
$$R^2\cos(\beta_{ccw}L - \beta_{cw}L - 2\phi_r) + R^2\cos(2\beta_{cw}L - 2\theta) -$$
$$R^3\cos(\beta_{ccw}L - 2\beta_{cw}L - \phi_r + \theta)] +$$

-continued
$$2\sin\psi[R\sin(\beta_{ccw}L - \phi_r - \theta) - R\sin(\beta_{cw}L - \phi_r - \theta) -$$
$$R\sin(\beta_{cw}L + \phi_r - \theta) - R^2\sin(\beta_{ccw}L - \beta_{cw}L) -$$
$$R^2\sin(\beta_{ccw}L - \beta_{cw}L - 2\phi_r) + R^2\sin(2\beta_{cw}L - 2\theta) -$$
$$R^3\sin(\beta_{ccw}L - 2\beta_{cw}L - \phi_r + \theta)]\}$$

This last expression gives the intensity of the electromagnetic waves impinging on photodetector 23 in the presence of a single scattering location in resonator 10. Since the selected scattering example is entirely arbitrary, a similar equation would result for any other such scattering example. As a result, this last equation is generally representative of the results of photodetector 23 in the presence of plural scattering sites, but an equation representing this more general situation of additional scattering locations would have additional terms in that equation beyond those appearing in the last equation above, after the first term in this last equation, to represent the effects of such additional scattering locations. Because of the large density of such scattering locations along the optical path in a typical optical fiber used in resonator 10, many such additional terms may alternatively be represented in terms having an integral over the resonator fiber length therein. However, assuming there would be no significant dependence of the results of one scattering center upon the results at another, the additional terms would be merely cumulative but unchanged in nature from those appearing after the first term in the last equation.

This follows from neglecting small, higher order contributions to the intensity on photodetector 23 due to counterclockwise waves arising from multiple backscattering occurrences. That the results of multiple backscatterings are small corresponding intensities is important as a solution effective against an initial backscattering occurrence (which will have the greatest corresponding intensity compared to intensities due to multiple backscatterings) will not necessarily be effective against the results of multiple occurrences.

The first term in the last equation is the expected resonance function in an ideal resonator coil devoid of scattering locations. The feedback loop into which the output signal photodiode 23 is provided will, in the absence of other error components and the intensity of the electromagnetic waves impinging thereon, act to keep frequency $f_o+f_1$ at its resonance value by shifting the value of $f_1$ sufficiently so that any signal component at frequency $f_n$ is driven to zero. At resonance, the argument of the squared sine function will be zero in this first term.

However, the remaining terms in this last equation for $I_{ccw-d}$ represent potential sources of error. The second term, however, can be avoided as a source of error by, as noted above, choosing $f_m$ to be at a frequency different from $f_n$. This is because the second term has only frequencies at $f_m$ therein, and so has no significant frequency component at frequency $f_n$ to be demodulated by phase detector 37.

On the other hand, the remaining term in this last equation for $I_{ccw-d}$, formed from the last two terms of the previous equation which are complex conjugates of one another, will clearly have a signal component contribution at frequency $f_n$ which will be demodulated by phase sensitive detector 37. An appropriate selection for the amplitude of the output signal of backscatter reduction modulation generator 50, through a proper setting of adjuster 51, to set the corresponding phase modulation amplitude in phase modulator 20 will reduce the value of the contribution of this last term at frequency $f_n$ as will be shown below, and can even eliminate the error contribution thereby in some circumstances. However, this amplitude setting of the phase modulation in modulator 20 cannot be reliably maintained over temperature, at least not without constructing some additional compensation arrangement therefor of sufficiently good capability. Thus, there is desired a supplemental manner for reducing or eliminating the effect of such an error term in the input signal for the serrodyne control feedback loop.

SUMMARY OF THE INVENTION

The present invention provides an error reduction arrangement for reducing rotation rate errors arising because of electromagnetic wave backscattering in a coiled optical fiber in a rotation sensor capable of sensing rotation about an axis of the coiled fiber formed in a closed optical path having a coupler connected thereto to permit electromagnetic waves to be coupled between this coiled optical fiber and an external optical fiber. Rotation is sensed based on having a pair of electromagnetic waves traveling through the coiled optical fiber in opposing directions to each impinge on a corresponding one of a pair of photodetectors. Each of these opposing waves is subject to having its phase varied by selected signals applied to inputs of at least one of first and second phase modulators, and the photodetectors receiving such waves each providing an output signal in response thereto that is representative of that wave received. A first resonance determination signal generator is electrically connected to the first phase modulator to be capable of providing a phase modulation component in the corresponding electromagnetic wave in the resonator, and has a first resonance determination amplitude control signal generator connected thereto to adjust the amplitude of the output signal of the first resonance determination signal generator, and so the amplitude of the phase modulation component due thereto established by the first phase modulator. A second resonance determination signal generator is electrically connected to the second phase modulator to be capable of providing a phase modulation component in the corresponding electromagnetic wave in the resonator. A backscatter reduction resonance determination signal generator is electrically connected to one of the first and second phase modulators to be capable of providing a phase modulation component an electromagnetic wave in the resonator, and has a backscatter reduction resonance determination amplitude control signal generator connected thereto to determine the amplitude of the output signal of the backscatter reduction resonance determination signal generator and so the amplitude of the phase modulation component due thereto established by the phase modulator to which it is connected.

A controlled frequency adjustment signal generator also provides an output signal to the phase modulator at a selected operation frequency, and typically has an output waveform that essentially follows a serrodyne waveform. A signal component selector extracts the desired signal component from the photodetector output signal and provides a signal based thereon to set the controlled frequency adjustment signal generator to select a frequency of operation therefor. An integrator may be included in the signal component selector ahead of its connection to the controlled frequency adjustment signal generator to eliminate certain errors. Electromagnetic waves in the resonator coil may reach the corresponding photodetector either through the coupler initially described above, or through a second coupler also connected to the coiled optical fiber to couple electromagnetic waves between it and another external fiber.

DETAILED DESCRIPTION OF THE PREFERRED EMBODIMENTS

The final term in the last equation given above for $I_{ccw-d}$ is, as indicated above, the source of error in the serrodyne control feedback loop used to set the value of frequency $f_1$. (A similar term is present in the corresponding equation for $I_{cw-d}$ is a source of error in the laser feedback loop used to control the value of frequency $f_o$ and, of course, there are additional terms present in more generally representative equations for the photodetector output signals used for each control feedback loop when additional scattering sites are taken into account.) However, the value of the signal component at frequency $f_n$ contributed by this last term in the last equation for $I_{ccw-d}$ is quite unclear from this term as presently written in that equation. Thus, this term must be analyzed to determine its spectral content which requires substantial amount of algebra and judicious approximation if a closed form therefor is to be obtained.

Figure 1:
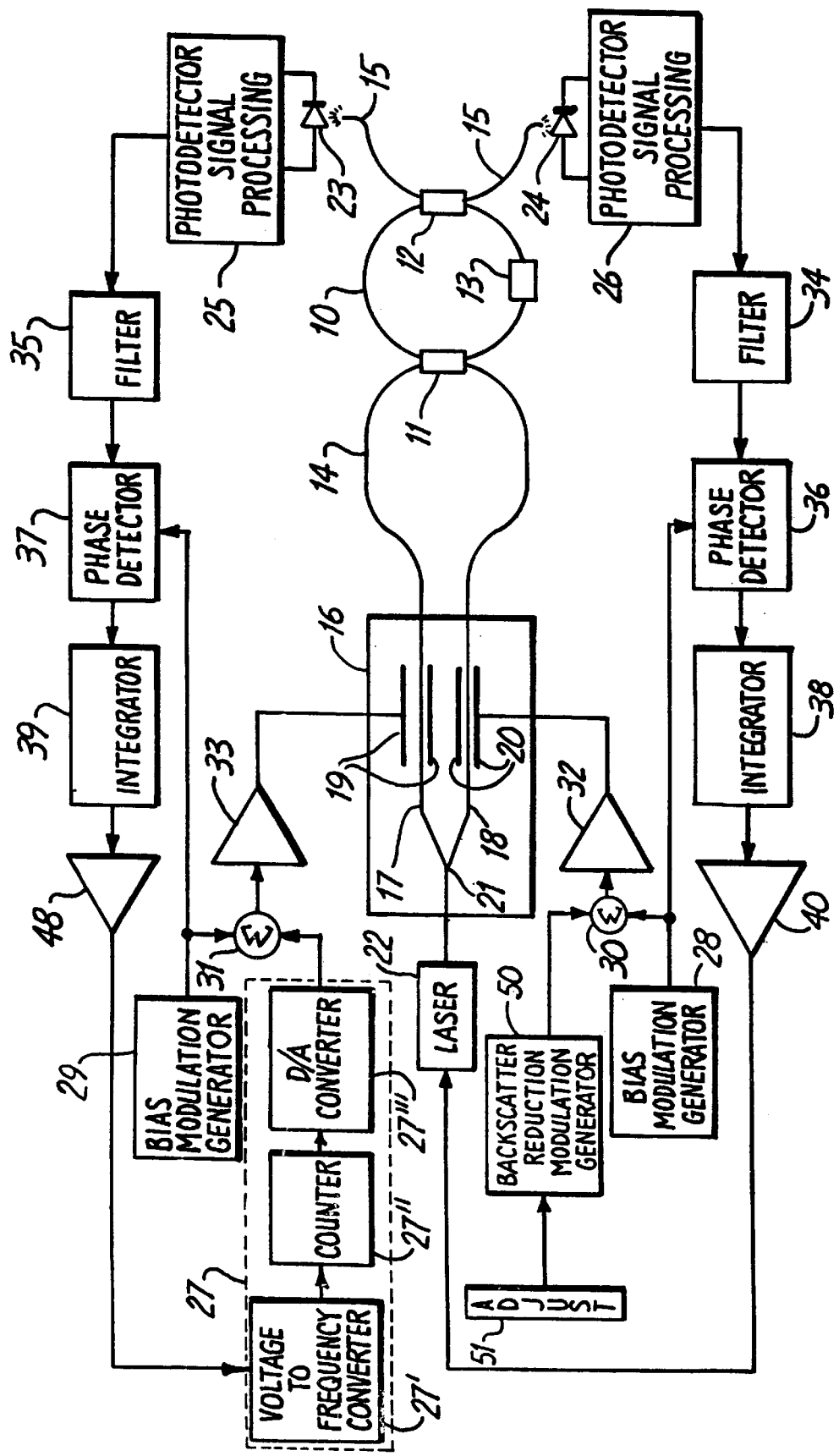
FIG. 1 shows a system schematic diagram of a resonator fiber optical gyroscope system known in the prior art combining a signal processing arrangement and an optical transmission path and device arrangement.

Considering first the factor in fractional form of this last term, that factor has a denominator with three factors which can be well approximated using a truncated MacLaurin series therefor, or:

$$\frac{1}{(1-R)^2 + 4R\sin^2\left(\frac{x}{2}\right)} \cong \frac{1}{(1-R)^2} - \frac{4R\sin^2\left(\frac{x}{2}\right)}{(1-R)^4}$$

$$= \frac{1}{(1-R)^2} - \frac{2R(1-\cos x)}{(1-R)^4}$$

where a trigonometric identity has been used in the latter representation in this last equation. This approximation is a good one for sufficiently small values of x, and so is a good one in the situation where the fiber optic gyroscope of FIG. 1 is operating essentially at resonance for each of the counterpropagating electromagnetic waves in coil 10, and where the modulation depths due to the modulations caused by bias modulation generators 28 and 29 and backscatter reduction modulation generator 50 are relatively small. This conclusion can be reached from consideration of the arguments of the squared sine function in each of the denominator factors.

Thus, the trigonometric function involved in the first denominator factor after the foregoing approximation and identity substitution is:

$$\cos(-\phi_r - \theta + \beta_{ccw}L) = \cos(\beta_{o-1}L - \Delta\beta_n L \sin\omega_n t - \phi_r - \theta)$$

The condition for counterclockwise wave resonance is $\beta_{o-1}L - \phi_r - \theta = 0$ as this relationship clearly gives the maximum value for the first term in the last equation above for $I_{ccw-d}$ by causing the squared sine factor in the denominator of that term to take the value zero. Hence, the resonance condition yields in the last equation $$\cos(-\phi_r - \theta + \beta_{ccw}L) = \cos(-\Delta\beta_n L \sin\omega_n t)$$

$$= \cos(\Delta\beta_n L \sin\omega_n t)$$

$$= J_o(\Delta\beta_n L) + 2J_2(\Delta\beta_n L)\cos 2\omega_n t +$$

$$2J_4(\Delta\beta_n L)\cos 4\omega_n t + \ldots$$

using a trigonometric identity and the well-known Bessel function infinite series for a cosine of a sine argument. Here, $J_o(\Delta\beta_n)$ is the zeroth order Bessel function, $J_2(\Delta\beta_n)$ is the second order Bessel function, etc. As can be seen from the first of the equalities in this last equation, the argument $\Delta\beta_{ccw}L - \phi_r - \theta$ is small if the gyroscope system of FIG. 1 is operating at resonance, and if the change in the phase modulation propagation constant $\Delta\beta_n = \Delta\phi_n\omega_n n/c$ is small which it will be if the modulation amplitude $\Delta\phi_n$ or the angular frequency $\omega_n$ is kept small. If this argument is kept small, the sine squared function will also be relatively small making the above truncated infinite series approximation a very good approximation.

Similarly, the trigonometric function for the second denominator factor in the fractional factor of the last term in the last equation for $I_{ccw-d}$ after the foregoing approximation and substitution of the trigonometric identity is:

$$\cos(-\phi_r - \theta + \beta_{cw}L) = \cos(\beta_o L - \Delta\beta_m L\sin\omega_m t - \Delta\beta_j L\sin\omega_j t - \phi_r - \theta)$$

$$= J_o(\Delta\beta_m L) + 2J_2(\Delta\beta_m L)\cos 2\omega_m t +$$

$$2J_4(\Delta\beta_m L)\cos 4\omega_m t + \ldots$$

using the clockwise wave resonance condition, $\beta_o L - \phi_r - \theta = 0$. In reaching this result, the term involving angular frequency $\omega_j$ is ignored because the corresponding propagation constant change amplitude $\Delta\beta_j = \Delta\phi_j\omega_j n/c$ will be very small compared to $\Delta\beta_n = \Delta\phi_n\omega_n n/c$ because of $\omega_j$ being very small with respect to $\omega_m$.

The trigonometric function for the third denominator factor in the fractional factor of the last term in the last equation for $I_{ccw-d}$ after this truncated infinite series approximation and trigonometric identity substitution differs because of the plus sign in front of the rotation rate $\phi_r$. In these circumstances, the sum of this term, $-\theta$ and $\beta_o L$ will not be zero at resonance as they are in the preceding equation which had a negative sign in front of $\phi_r$. Thus, the following result is instead obtained:

$$\cos(\phi_r - \theta + \beta_{cw}L) = \cos(\beta_o L - \Delta\beta_m L\sin\omega_m t - \Delta\beta_j L\sin\omega_j t + \phi_r - \theta)$$

$$= \cos(\beta_o L + \phi_r - \theta)\cos(\Delta\beta_m L\sin\omega_m t) +$$

$$\sin(\beta_o L + \phi_r - \theta)\sin(\Delta\beta_m L\sin\omega_m t)$$

$$= \cos(\beta_o L + \phi_r - \theta)[J_o(\Delta\beta_m L) +$$

$$2J_2(\Delta\beta_m L)\cos 2\omega_m t + 2J_4(\Delta\beta_m L)\cos 4\omega_m t + \ldots] +$$

$$\sin(\beta_o L + \phi_r - \theta)[2J_1(\Delta\beta_m L)\sin\omega_m t + 2J_3(\Delta\beta_m L)\sin 3\omega_m t + \ldots]$$

where again the term involving angular frequency $\omega_j$ is ignored because the corresponding propagation constant change amplitude will be very small.

With these results, the fractional factor of the last term in the last equation above for $I_{ccw\text{-}d}$ can be approximated as follows:

$$\frac{(R')^2|E_{in}|^2\eta_1\sqrt{1-k_1}\sqrt{1-\gamma_1}}{\left[(1-R)^2+4R\sin^2\left(\frac{-\phi_r-\theta+\beta_{ccw}L}{2}\right)\right]\left[(1-R)^2+4R\sin^2\left(\frac{-\phi_r-\theta+\beta_{cw}L}{2}\right)\right]} +$$

$$\frac{1}{\left[(1-R)^2+4R\sin^2\left(\frac{\phi_r-\theta+\beta_{cw}L}{2}\right)\right]} \cong (R')^2|E_{in}|^2\eta_1\sqrt{1-k_1}\sqrt{1-\gamma_1}\left\{\frac{1}{(1-R)^2} - \right.$$

$$\frac{2R}{(1-R)^4}[1 - J_o(\Delta\beta_n L) - 2J_2(\Delta\beta_n L)\cos 2\omega_n t - 2J_4(\Delta\beta_n L)\cos 4\omega_n t + \ldots]\right\} \times$$

$$\left\{\frac{1}{(1-R)^2} - \frac{2R}{(1-R)^4}[1 - J_o(\Delta\beta_m L) - 2J_2(\Delta\beta_m L)\cos 2\omega_m t - 2J_4(\Delta\beta_m L)\cos 4\omega_m t + \ldots]\right\} \times$$

$$\left\{\frac{1}{(1-R)^2} - \frac{2R}{(1-R)^2}\{1 - \cos(\beta_o L + \phi_r - \theta)[J_o(\Delta\beta_m L) + \right.$$

$$2J_2(\Delta\beta_m L)\cos 2\omega_m t + 2J_4(\Delta\beta_m L)\cos 4\omega_m t + \ldots] +$$

$$\sin(\beta_o L + \phi_r - \theta)[2J_1(\Delta\beta_m L)\sin\omega_m t + 2J_3(\Delta\beta_m L)\sin 3\omega_m t + \ldots]\}\right\}$$

This last equation can be significantly reduced in the number of terms therein through knowing that many of those terms are negligible. Thus, because the products of the sinusoidal bias modulation angular frequencies and corresponding amplitudes, $\omega_m\Delta\phi_m$ and $\omega_n\Delta\phi_n$, are kept relatively small, the arguments of the Bessel functions $\Delta\beta_m L$ and $\Delta\beta_n L$ are also quite small. As a result, Bessel functions of orders four and above can all be neglected as being very small. Similarly, products of Bessel functions involving Bessel functions of order two or greater will also be very small and can be neglected. Again because of the small values of $\Delta\beta_n L$ and $\Delta\beta_m L$, the zeroth order Bessel functions can be written as $J_0(\Delta\beta_n L) \approx 1 \approx J_0(\Delta\beta_m L)$.

As previously indicated, resonance conditions $\beta_{o-1}L-\phi_r-\theta=0$ and $\beta_o L-\phi_r-\theta=0$ are met at resonance. However, in the situation where the sign of $\phi_r$ is positive rather than negative in the otherwise same equations, these immediately foregoing resonance conditions could not continue to be maintained at resonance, and also have similar equations be true except for $\phi_r$ carrying a positive sign therein. Nevertheless, at low rotation rates, the resonance condition equations will be approximately met at resonance even if a plus sign is substituted for the minus sign of $\phi_r$. Thus, at low rotation rates, $\sin(\beta_o L+\phi_r-\theta)\approx 0$ and $\cos(\beta_o L+\phi_r-\theta)\approx 1$. At high rotation rates where $\phi_r$ is of substantial value, the output signal from controlled serrodyne generator 27 at frequency $f_1$ will be a signal of quite high frequency and so will leave the backscattering error term under consideration averaging zero so as not to be of concern.

With these considerations, the expanded form of the fractional factor of the last term in the last equation above for $I_{ccw\text{-}d}$, given just above, can be written as:

$$\frac{(R')^2|E_{in}|^2\eta_1\sqrt{1-k_1}\sqrt{1-\gamma_1}}{\left[(1-R)^2+4R\sin^2\left(\frac{-\phi_r-\theta+\beta_{ccw}L}{2}\right)\right]\left[(1-R)^2+4R\sin^2\left(\frac{-\phi_r-\theta+\beta_{cw}L}{2}\right)\right]} \times$$

$$\frac{1}{\left[(1-R)^2+4R\sin^2\left(\frac{-\phi_r-\theta+\beta_{ccw}L}{2}\right)\right]} \cong$$

$$(R')^2|E_{in}|^2\eta_1\sqrt{1-k_1}\sqrt{1-\gamma_1}\left[\frac{1}{(1-R)^2} + \frac{4RJ_2(\Delta\beta_n L)}{(1-R)^4}\cos 2\omega_n t\right]\times\left[\frac{1}{(1-R)^2} + \right.$$

$$\left.\frac{4RJ_2(\Delta\beta_m L)}{(1-R)^4}\cos 2\omega_m t\right] \times \left[\frac{1}{(1-R)^2} + \frac{4RJ_2(\Delta\beta_m L)}{(1-R)^4}\cos 2\omega_m t\right] \simeq$$

$$(R')^2|E_{in}|^2\eta_1\sqrt{1-k_1}\sqrt{1-\gamma_1} \times \left[\frac{1}{(1-R)^6} + \frac{4RJ_2(\Delta\beta_n L)}{(1-R)^8}\cos 2\omega_n t + \frac{8RJ_2(\Delta\beta_m L)}{(1-R)^8}\cos 2\omega_m t\right]$$

Thus, the last equation for $I_{ccw-d}$ can be written as:

$$I_{ccw-d}(t) = \frac{(R')^2|E_{in}|^2}{(1-R)^2 + 4R\sin^2\left(\frac{\phi_r + \theta - \beta_{ccw}L}{2}\right)} +$$

$$\frac{(R')^2|E_{in}|^2\eta_1^2(1-k_1)(1-\gamma_1)}{\left[(1-R^2) + 4R\sin^2\left(\frac{\phi_r+\theta-\beta_{cw}L}{2}\right)\right]\left[(1-R)^2 + 4R\sin^2\left(\frac{-\phi_r+\theta-\beta_{cw}L}{2}\right)\right]} +$$

$$(R')^2|E_{in}|^2\eta_1\sqrt{1-k_1}\sqrt{1-\gamma_1} \times$$

$$\left[\frac{1}{(1-R)^6} \times \frac{4RJ_2(\Delta\beta_n L)}{(1-R)^8}\cos 2\omega_n t + \frac{8RJ_2(\Delta\beta_m L)}{(1-R)^8}\cos 2\omega_m t\right] \times$$

$$\{2\cos\psi[1 - R\cos(\beta_{ccw}L - \phi_r - \theta) - R\cos(\beta_{cw}L - \phi_r - \theta) -$$

$$R\cos(\beta_{cw}L + \phi_r - \theta) + R^2\cos(\beta_{ccw}L - \beta_{cw}L) +$$

$$R^2\cos(\beta_{ccw}L - \beta_{cw}L - 2\phi_r) + R^2\cos(2\beta_{cw}L - 2\theta) -$$

$$R^3\cos(\beta_{ccw}L - 2\beta_{cw}L - \phi_r + \theta)] +$$

$$2\sin\psi[R\sin(\beta_{ccw}L - \phi_r - \theta) - R\sin(\beta_{cw}L - \phi_r - \theta) -$$

$$R\sin(\beta_{cw}L + \phi_r - \theta) - R^2\sin(\beta_{ccw}L - \beta_{cw}L) -$$

$$R^2\sin(\beta_{ccw}L - \beta_{cw}L - 2\phi_r) + R^2\sin(2\beta_{cw}L - 2\theta) -$$

$$R^3\sin(\beta_{ccw}L - 2\beta_{cw}L - \phi_r + \theta)]\}$$

The remaining terms within the braces of this last equation must also be expanded and simplified to determine the spectral content of the equation. The next factors in what is now the last major term of the equation are cosine $\psi$ and sine $\psi$ as has been set out above as a series of added and subtracted terms. Thus, these factors cosine $\psi$ and sine $\psi$ are expanded by repeated use of the trigonometric identities for sums and differences of angles to the point that each bias modulation time dependence angle appears as a separate argument of a trigonometric function so that its spectral content at the bias modulation frequencies can be examined. Such an examination, along with similar examinations of other expanded terms, permits determination of the signal component at frequency $f_n$ which will be provided at the output of phase detector 37 because of the electromagnetic wave intensity impinging on photodetector 23. Thus, $\psi$ is redefined to segregate the bias modulation frequency terms from the others therein, to limit the amount of expansion of cosine $\psi$ and sine $\psi$ necessary for this purpose, yielding:

$$\psi = -[-\omega_1 t + \beta_{o-1}(l_1 + l_{17}) - \beta_o(l_1 + l_{18}) - \beta_o 2l_3 + \varphi +$$

$$\Delta\phi_j\cos\omega_j t - \Delta\phi_n\cos\omega_n t + \Delta\beta_n l_1\sin\omega_n t + \Delta\phi_m\cos\omega_m t -$$

$$\Delta\beta_m(l_1 + 2l_3)\sin\omega_m t]$$

$$= -[x(t) - \Delta\phi_n\cos\omega_n t + \Delta\beta_n l_1\sin\omega_n t +$$

$$\Delta\phi_m\cos\omega_m t - \Delta\beta_m(l_1 + 2l_3)\sin\omega_m t];$$

$$x(t) \stackrel{\Delta}{=} x_o(t) + \Delta\phi_j\cos\omega_j t,$$

$$x_o(t) \stackrel{\Delta}{=} \beta_{o-1}(l_1 + l_{17}) - \beta_o(l_1 + l_{18}) - \beta_o 2l_3 + \varphi - \omega_1 t.$$

With these definitions, cosine $\psi$ and sine $\psi$ after appropriate expansion can be written as:

$$\cos\psi = \cos[x(t) - \Delta\phi_n\cos\omega_n t + \Delta\beta_n l_1\sin\omega_n t + \Delta\phi_m\cos\omega_m t - \Delta\beta_m(l_1 + 2l_3)\sin\omega_m t]$$

$$= \cos(x)\cos(\Delta\phi_n\cos\omega_n t)\cos(\Delta\beta_n l_1\sin\omega_n t)\cos(\Delta\phi_m\cos\omega_m t)\cos[\Delta\beta_m(l_1 + 2l_3)\sin\omega_m t] +$$
$$\cos(x)\cos(\Delta\phi_n\cos\omega_n t)\cos(\Delta\beta_n l_1\sin\omega_n t)\sin(\Delta\phi_m\cos\omega_m t)\sin[\Delta\beta_m(l_1 + 2l_3)\sin\omega_m t] -$$
$$\cos(x)\cos(\Delta\phi_n\cos\omega_n t)\sin(\Delta\beta_n l_1\sin\omega_n t)\sin(\Delta\phi_m\cos\omega_m t)\cos[\Delta\beta_m(l_1 + 2l_3)\sin\omega_m t] +$$
$$\cos(x)\cos(\Delta\phi_n\cos\omega_n t)\sin(\Delta\beta_n l_1\sin\omega_n t)\cos(\Delta\phi_m\cos\omega_m t)\sin[\Delta\beta_m(l_1 + 2l_3)\sin\omega_m t] +$$
$$\cos(x)\sin(\Delta\phi_n\cos\omega_n t)\sin(\Delta\beta_n l_1\sin\omega_n t)\cos(\Delta\phi_m\cos\omega_m t)\cos[\Delta\beta_m(l_1 + 2l_3)\sin\omega_m t] +$$
$$\cos(x)\sin(\Delta\phi_n\cos\omega_n t)\sin(\Delta\beta_n l_1\sin\omega_n t)\sin(\Delta\phi_m\cos\omega_m t)\sin[\Delta\beta_m(l_1 + 2l_3)\sin\omega_m t] +$$
$$\cos(x)\sin(\Delta\phi_n\cos\omega_n t)\cos(\Delta\beta_n l_1\sin\omega_n t)\sin(\Delta\phi_m\cos\omega_m t)\cos[\Delta\beta_m(l_1 + 2l_3)\sin\omega_m t] -$$
$$\cos(x)\sin(\Delta\phi_n\cos\omega_n t)\cos(\Delta\beta_n l_1\sin\omega_n t)\cos(\Delta\phi_m\cos\omega_m t)\sin[\Delta\beta_m(l_1 + 2l_3)\sin\omega_m t] +$$
$$\sin(x)\sin(\Delta\phi_n\cos\omega_n t)\cos(\Delta\beta_n l_1\sin\omega_n t)\cos(\Delta\phi_m\cos\omega_m t)\cos[\Delta\beta_m(l_1 + 2l_3)\sin\omega_m t] +$$
$$\sin(x)\sin(\Delta\phi_n\cos\omega_n t)\cos(\Delta\beta_n l_1\sin\omega_n t)\sin(\Delta\phi_m\cos\omega_m t)\sin[\Delta\beta_m(l_1 + 2l_3)\sin\omega_m t] -$$
$$\sin(x)\sin(\Delta\phi_n\cos\omega_n t)\sin(\Delta\beta_n l_1\sin\omega_n t)\sin(\Delta\phi_m\cos\omega_m t)\cos[\Delta\beta_m(l_1 + 2l_3)\sin\omega_m t] +$$
$$\sin(x)\sin(\Delta\phi_n\cos\omega_n t)\sin(\Delta\beta_n l_1\sin\omega_n t)\cos(\Delta\phi_m\cos\omega_m t)\sin[\Delta\beta_m(l_1 + 2l_3)\sin\omega_m t] -$$
$$\sin(x)\sin(\Delta\phi_n\cos\omega_n t)\sin(\Delta\beta_n l_1\sin\omega_n t)\cos(\Delta\phi_m\cos\omega_m t)\cos[\Delta\beta_m(l_1 + 2l_3)\sin\omega_m t] -$$
$$\sin(x)\cos(\Delta\phi_n\cos\omega_n t)\sin(\Delta\beta_n l_1\sin\omega_n t)\sin(\Delta\phi_m\cos\omega_m t)\sin[\Delta\beta_m(l_1 + 2l_3)\sin\omega_m t] -$$
$$\sin(x)\cos(\Delta\phi_n\cos\omega_n t)\cos(\Delta\beta_n l_1\sin\omega_n t)\sin(\Delta\phi_m\cos\omega_m t)\cos[\Delta\beta_m(l_1 + 2l_3)\sin\omega_m t] -$$
$$\sin(x)\cos(\Delta\phi_n\cos\omega_n t)\cos(\Delta\beta_n l_1\sin\omega_n t)\cos(\Delta\phi_m\cos\omega_m t)\sin[\Delta\beta_m(l_1 + 2l_3)\sin\omega_m t]$$

$$\sin\psi = -\sin[x(t) - \Delta\phi_n\cos\omega_n t + \Delta\beta_n l_1\sin\omega_n t + \Delta\phi_m\cos\omega_m t - \Delta\beta_m(l_1 + 2l_3)\sin\omega_m t]$$

$$= -\sin(x)\cos(\Delta\phi_n\cos\omega_n t)\cos(\Delta\beta_n l_1\sin\omega_n t)\cos(\Delta\phi_m\cos\omega_m t)\cos[\Delta\beta_m(l_1 + 2l_3)\sin\omega_m t] -$$
$$\sin(x)\cos(\Delta\phi_n\cos\omega_n t)\cos(\Delta\beta_n l_1\sin\omega_n t)\sin(\Delta\phi_m\cos\omega_m t)\sin[\Delta\beta_m(l_1 + 2l_3)\sin\omega_m t] +$$
$$\sin(x)\cos(\Delta\phi_n\cos\omega_n t)\sin(\Delta\beta_n l_1\sin\omega_n t)\sin(\Delta\phi_m\cos\omega_m t)\cos[\Delta\beta_m(l_1 + 2l_3)\sin\omega_m t] -$$
$$\sin(x)\cos(\Delta\phi_n\cos\omega_n t)\sin(\Delta\beta_n l_1\sin\omega_n t)\cos(\Delta\phi_m\cos\omega_m t)\sin[\Delta\beta_m(l_1 + 2l_3)\sin\omega_m t] -$$
$$\sin(x)\sin(\Delta\phi_n\cos\omega_n t)\sin(\Delta\beta_n l_1\sin\omega_n t)\cos(\Delta\phi_m\cos\omega_m t)\cos[\Delta\beta_m(l_1 + 2l_3)\sin\omega_m t] -$$
$$\sin(x)\sin(\Delta\phi_n\cos\omega_n t)\sin(\Delta\beta_n l_1\sin\omega_n t)\sin(\Delta\phi_m\cos\omega_m t)\sin[\Delta\beta_m(l_1 + 2l_3)\sin\omega_m t] -$$
$$\sin(x)\sin(\Delta\phi_n\cos\omega_n t)\cos(\Delta\beta_n l_1\sin\omega_n t)\sin(\Delta\phi_m\cos\omega_m t)\cos[\Delta\beta_m(l_1 + 2l_3)\sin\omega_m t] +$$
$$\sin(x)\sin(\Delta\phi_n\cos\omega_n t)\cos(\Delta\beta_n l_1\sin\omega_n t)\cos(\Delta\phi_m\cos\omega_m t)\sin[\Delta\beta_m(l_1 + 2l_3)\sin\omega_m t] +$$
$$\cos(x)\sin(\Delta\phi_n\cos\omega_n t)\cos(\Delta\beta_n l_1\sin\omega_n t)\cos(\Delta\phi_m\cos\omega_m t)\cos[\Delta\beta_m(l_1 + 2l_3)\sin\omega_m t] +$$
$$\cos(x)\sin(\Delta\phi_n\cos\omega_n t)\cos(\Delta\beta_n l_1\sin\omega_n t)\sin(\Delta\phi_m\cos\omega_m t)\sin[\Delta\beta_m(l_1 + 2l_3)\sin\omega_m t] -$$
$$\cos(x)\sin(\Delta\phi_n\cos\omega_n t)\sin(\Delta\beta_n l_1\sin\omega_n t)\sin(\Delta\phi_m\cos\omega_m t)\cos[\Delta\beta_m(l_1 + 2l_3)\sin\omega_m t] +$$
$$\cos(x)\sin(\Delta\phi_n\cos\omega_n t)\sin(\Delta\beta_n l_1\sin\omega_n t)\cos(\Delta\phi_m\cos\omega_m t)\sin[\Delta\beta_m(l_1 + 2l_3)\sin\omega_m t] -$$
$$\cos(x)\sin(\Delta\phi_n\cos\omega_n t)\sin(\Delta\beta_n l_1\sin\omega_n t)\cos(\Delta\phi_m\cos\omega_m t)\cos[\Delta\beta_m(l_1 + 2l_3)\sin\omega_m t] -$$
$$\cos(x)\cos(\Delta\phi_n\cos\omega_n t)\sin(\Delta\beta_n l_1\sin\omega_n t)\sin(\Delta\phi_m\cos\omega_m t)\sin[\Delta\beta_m(l_1 + 2l_3)\sin\omega_m t] -$$
$$\cos(x)\cos(\Delta\phi_n\cos\omega_n t)\cos(\Delta\beta_n l_1\sin\omega_n t)\sin(\Delta\phi_m\cos\omega_m t)\cos[\Delta\beta_m(l_1 + 2l_3)\sin\omega_m t] -$$
$$\cos(x)\cos(\Delta\phi_n\cos\omega_n t)\cos(\Delta\beta_n l_1\sin\omega_n t)\cos(\Delta\phi_m\cos\omega_m t)\sin[\Delta\beta_m(l_1 + 2l_3)\sin\omega_m t]$$

Insertion of the foregoing equations for cosine $\psi$ and sine $\psi$ into the last equation given for $I_{ccw-d}$ must thereafter be followed by expanding the terms between the brackets which are multiplied by 2 cosine $\psi$ and the terms between the brackets which are multiplied by 2 sine $\psi$ by substituting for $\beta_{ccw}$ and $\beta_{cw}$.

The result is an equation for that intensity which, upon completing all of the multiplications indicated therein, will result in thousands of terms. Each of these terms will in turn have one or more factors involving a trigonometric function of another trigonometric function which must be replaced by a corresponding infinite series of Bessel functions to complete the spectral decomposition of that intensity necessary to determine the nature of the signal which will be obtained from phase detector 37. An appropriate truncation of such series in each term must be made, and the resulting term reviewed insofar as determining whether is has a magnitude of sufficient significance to be included in the final result, much as was done for the first combination of terms forming the first factor in the last equation for $I_{ccw-d}$.

Because of the large numbers of terms and factors involved, this selection, although achievable manually by a person sufficiently skilled in mathematics expending sufficient effort, is probably best accomplished through use of a computer having a program operating thereon with suitable mathematical capabilities. The computer is directed to follow prescribed selection rules for selecting terms considered to contribute significantly to output signal of phase sensitive detector 37, $v_{37}$. The result is found to be:

$$v_{37} \simeq$$

$$G_o(R')^2|E_{in}|^2 \left\{ \left\{ \left\{ \int_o^{\frac{1}{f_n}} \frac{1}{(1-R)^2 + 4R\sin^2\left(\frac{\phi_r + \theta - \beta_{ccw}L}{2}\right)} \sin\omega_n t \, dt \right. \right. \right. +$$

$$16\eta_1\sqrt{1-k_1}\sqrt{1-\gamma_1}\, J_o(\Delta\phi_j)J_o(\Delta\phi_m)\left\{\frac{2}{(1-R)^6}J_1(\Delta\phi_n) -\right.$$

$$\frac{4R}{(1-R)^8}[J_2(\Delta\beta_n L) + 2J_2(\Delta\beta_m L)]J_3(\Delta\phi_n)\right\} \times$$

$$\{\{\sin[\beta_{o-1}(l_1 + l_{17}) - \beta_o(l_1 + l_{18}) - \beta_o 2l_3 + \varphi - \omega_1 t] \times$$

$$\{\{1 + 2R\{\cos(\beta_{o-1}L - \phi_r - \theta) + \cos(\beta_o L - \phi_r -$$

$$\theta) + 2\cos[(\beta_{o-1} - \beta_o)L] + \cos(\beta_o L +$$

$$\phi_r - \theta) + 2R\cos[(\beta_{o-1} - \beta_o)L -$$

$$2\phi_r] + R\cos(2\beta_o L - 2\theta) +$$

-continued $$2R\cos[(\beta_{ol} - 2\beta_o)L - \phi_r + \theta]\}\} +$$

$$\cos[\beta_{o-1}(l_1 + l_{17}) - \beta_o(l_1 + l_{18}) - \beta_o 2l_3 +$$

$$\varphi - \omega_1 t] \times 2R\{\sin[(\beta_{o-1}L - \phi_r - \theta) +$$

$$\sin(\beta_o L - \phi_r - \theta)] + 2\sin[(\beta_{o-1} - \beta_o)L] +$$

$$\sin(\beta_o L + \phi_r - \theta) + 2R\sin[(\beta_{o-1} - \beta_o)L -$$

$$2\phi_r] + R\sin(2\beta_o L - 2\theta) +$$

$$2R^2\sin[(\beta_{o-1} - 2\beta_o)L - \phi_r + \theta]\}\}\}$$

Among the further approximations used in reaching this equation are $J_o(\Delta\beta_n l_1) \approx J_o[\Delta\beta_m(l_1+2l_3)] \approx J_o[2\Delta\beta_m(l_1+2l_3)] \approx 1$ because of the small values of the products of angular frequencies and corresponding amplitudes of the phase modulation due to bias modulation generators 28 and 29. The factor, $G_o$, shown as a constant, represents the effective gains of bias and amplification electronics 25, filter 35, and phase sensitive detector 37.

The first term in this last equation represents the signal out of phase sensitive detector 37 used to control the frequency of serrodyne generator 27 to maintain resonance of the counterclockwise electromagnetic wave in resonator 10. This term is shown as an integral over time rather than having been broken down to a signal component corresponding thereto at frequency $\omega_n$. Thus, the output signal of phase detector 37 corresponding to this first term in the last equation is the time average of (a) the signal at its signal input from the output of filter 35 represented as the first term in the equation for the intensity on photodetector 23, $I_{ccw-d}$, multiplied by a constant representing the effective gains of bias and amplification electronics 25, filter 35, and phase sensitive detector 37, and (b) the signal at its demodulation input at frequency $f_n$, both multiplied together and having the average thereof taken over the period of the modulation signal, $T_n = 2\pi/\omega_n = 1/f_n$.

This integral, as a function of the frequency $f_o+f_1$ occurring in the factor $\beta_o$ in $\beta_{ccw}$, will provide an error signal, indicating by its value and algebraic sign where $f_o+f_1$ is with respect to resonance to thereby provide a discriminant characteristic over frequency for the corresponding feedback loop. This error signal directs that feedback loop to act to cause the counterclockwise wave in resonator 10 to take a frequency that permits it to be in resonance therein. Any errors along the discriminant function are stored in integrator 38 so that they may be corrected in this feedback loop. A similar result is reached for the feedback loop associated with the clockwise electromagnetic wave in resonator 10 provided to adjust the frequency $f_o$ of laser 22 so that wave also stays in resonance therein.

However, this output signal of phase detector 37 corresponding to this first term in the last equation could also have been presented in using methods similar to those used above in finding the second term in this last equation, and the result would be a baseband term in cosine terms at multiples of $\omega_n$ if the counter-clockwise electromagnetic wave is in resonance in a steady state situation, with the further addition of some sinusoidal terms at $\omega_n$ and multiples thereof if the electromagnetic wave is in a transient situation between steady states. The sine terms, of course, disappear as a steady state is reached.

The second term in the equation above for the signal provided by phase sensitive detector 37 represents an error coming about because of backscattering of a portion of the clockwise electromagnetic wave being scattered from the scattering site used in the example to propagating in the counterclockwise direction. Again, there would be additional terms for additional scattering sites as occur in the actual optical fiber used in resonator 10, and of course phase detector 36 has an output signal providing a similar set of signals for the clockwise wave portion impinging on photodetector 24.

This second, or error, term in the last equation has the general form of three factors multiplying a set of sums. Clearly, if any of the three factors can be set to a zero value, this error term would also have a value of zero and so no longer interfere with operation of the system of FIG. 1. The first factor, $J_o(\Delta\phi_j)$, a zeroth order Bessel function with an argument that is the phase change amplitude at frequency $f_j$, can be set to zero by choosing the value for this phase change amplitude $\Delta\phi_j$ occurring at frequency $f_j$ to be one which leaves the zeroth order Bessel function thereof with a value of zero, as indicated above. Thus, amplitude adjuster 51 can be used to set the amplitude of the output signal of backscatter reduction modulation generator 50 for this purpose.

However, the relationship between the value chosen by adjuster 51 and the phase change provided by phase modulator 20 varies with temperature and the aging of the components involved. Thus, a value of the amplitude $\Delta\phi_j$ selected by adjustor 51 through backscatter reduction modulation generator 50 to be provided by phase modulator 20 cannot be relied on by itself to cause the error term found above in the signal from phase sensitive detector 37 to remain at zero, at least over environmental variation and sufficiently long time durations.

A further one of these three factors, $J_o(\Delta\phi_m)$ can also be given a value of zero by properly choosing the amplitude of the phase change $\Delta\phi_m$ provided by bias modulation generator 28. Thus, there is the possibility of having both factors set so close to zero that the drift in value of one over environmental change and long times will make much less difference because of the small value of the other. Since similar equations are found for the signal provided by phase detector 36, the corresponding factor in those equations, $J_0(\Delta\phi_n)$, should also be forced towards zero by properly selecting the phase modulation amplitude change $\Delta\phi_n$ provided by bias modulation generator 29.

Figure 2:
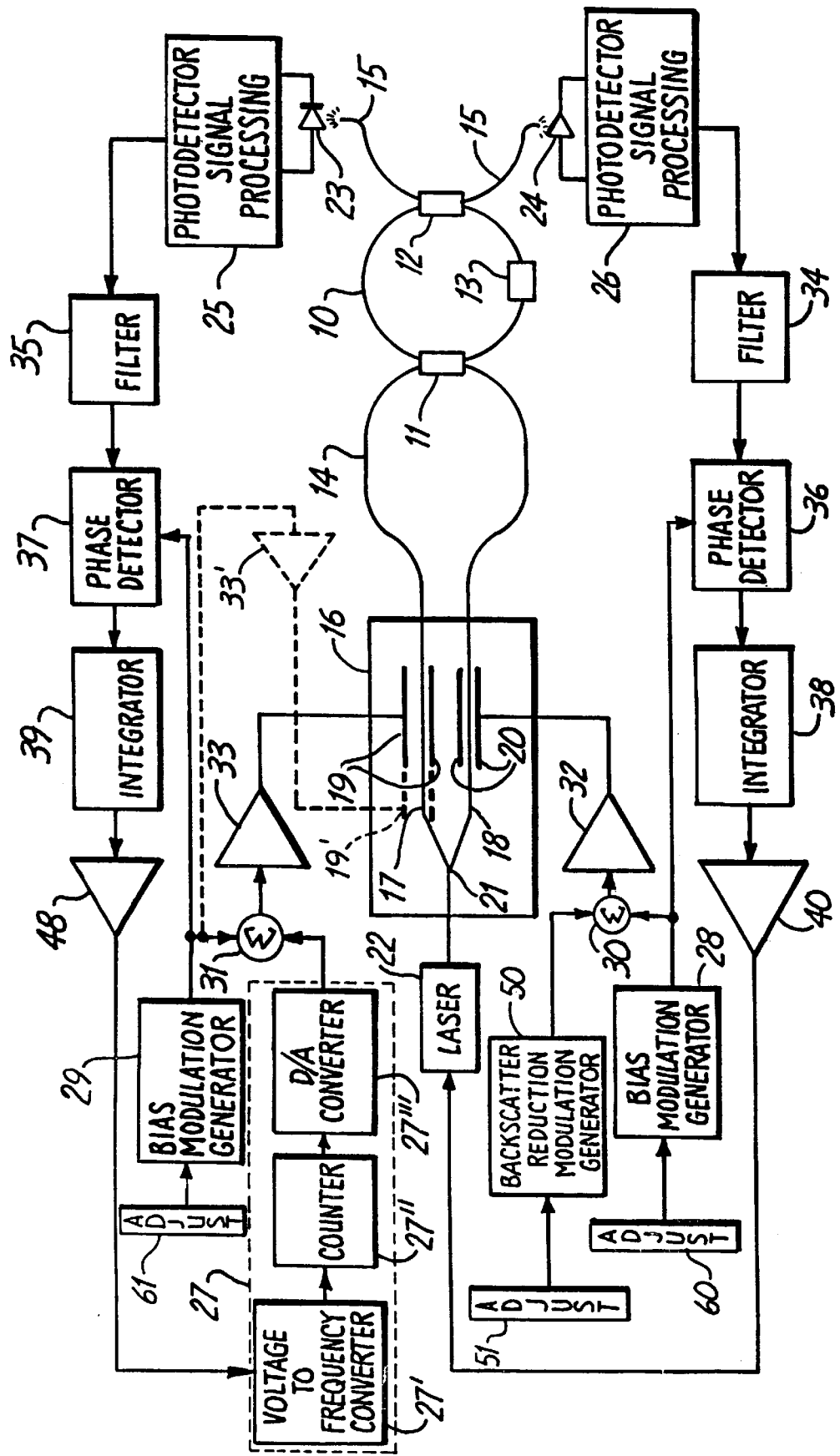
FIG. 2 shows a system schematic diagram of the present invention combining a signal processing arrangement and an optical transmission path and device arrangement.

The setting of the values of the amplitudes of these bias modulation phase changes is accomplished by providing amplitude adjusters, 60 and 61, shown in FIG. 2, to adjust the signal amplitudes provided by bias modulation generators 28 and 29, respectively. That is, an adjustment signal from adjuster 60 sets the amplitude of the output signal of bias modulation generator 28 to thereby set the phase modulation change in phase modulator 20 due to this output signal from generator 28. Similarly, adjuster 61 sets the amplitude of the output signal of bias modulation generator 29 to thereby set the amplitude of the phase change provided by phase modulator 19.

A further opportunity is shown to be present in the error term in the last equation for its reduction because of the further factor therein which can also be forced to a zero value, or $$\frac{2}{(1-R)^6}J_1(\Delta\phi_n) - \frac{4R}{(1-R)^8}[J_2(\Delta\beta_n L) + 2J_2(\Delta\beta_m L)]J_3(\Delta\phi_n) = 0$$

Because of the dependence of $\Delta\beta_n$ on $\Delta\phi_n$, and of $\Delta\beta_m$ on $\Delta\phi_m$, as given earlier, the arguments of the Bessel functions can be reduced to depending only on $\Delta\phi_n$ and $\Delta\phi_m$ and, in two instances, also on the bias modulation frequencies $\omega_n$ and $\omega_m$. Using those dependencies, and multiplying through by a value equal to the denominator of the first term divided by 2, results in $$J_1(\Delta\phi_n) - \frac{2R}{(1-R)^2}[J_2(\omega_n n_{eff}\Delta\phi_n L/c) + 2J_2(\omega_m n_{eff}\Delta\phi_m L/c)]J_3(\Delta\phi_n) = 0$$

A corresponding factor occurs in the equation representing the output signal of phase sensitive detector 36 for the clockwise electromagnetic wave, or $$J_1(\Delta\phi_m) - \frac{2R}{(1-R)^2}[J_2(\omega_m n_{eff}\Delta\phi_m L/c) + 2J_2(\omega_n n_{eff}\Delta\phi_n L/c)]J_3(\Delta\phi_m) = 0$$

Clearly, an optimum backscattering error reduction occurs if both of the last two equations are simultaneously satisfied. Since R, $n_{eff}$, L and c are all constants, these last two equations may be solved simultaneously for $\Delta\phi_n$ and $\Delta\phi_m$ once a choice is made for $\omega_n$ and $\omega_m$.

The variables of interest to be found from these last two equations, $\Delta\phi_n$ and $\Delta\phi_m$, occur in the arguments of Bessel functions, probably precluding the finding of a solution in terms of the constants therein at least in the absence of further approximations. That is, each of these equations contains infinite series in the variables $\Delta\phi_n$ and $\Delta\phi_m$. Solutions for these variables are more conveniently found using numerical methods on a digital computer.

Figure 3A:
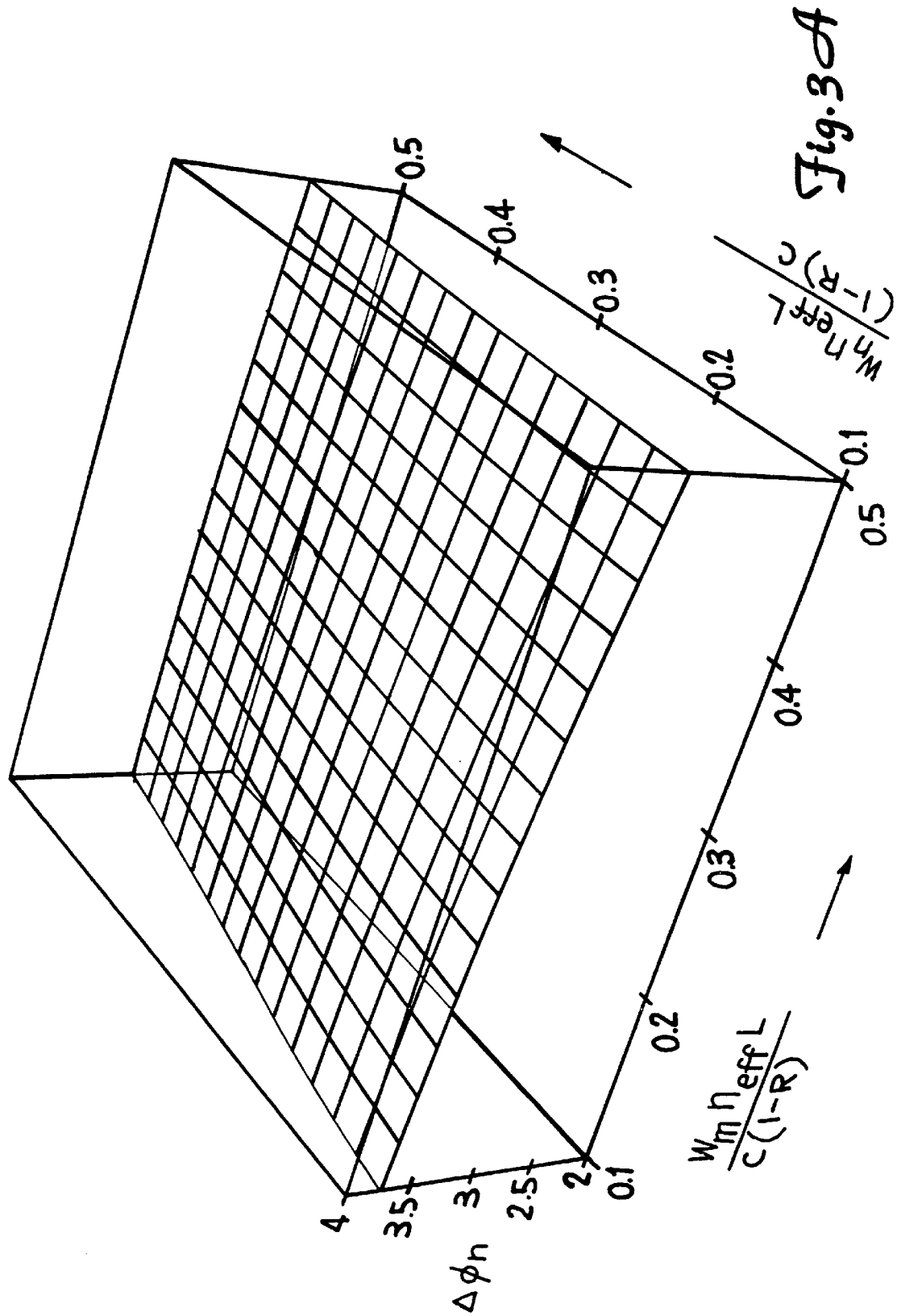
FIGS. 3A and 3B show graphs of selected parameter settings useable in the present invention.
Figure 3B:
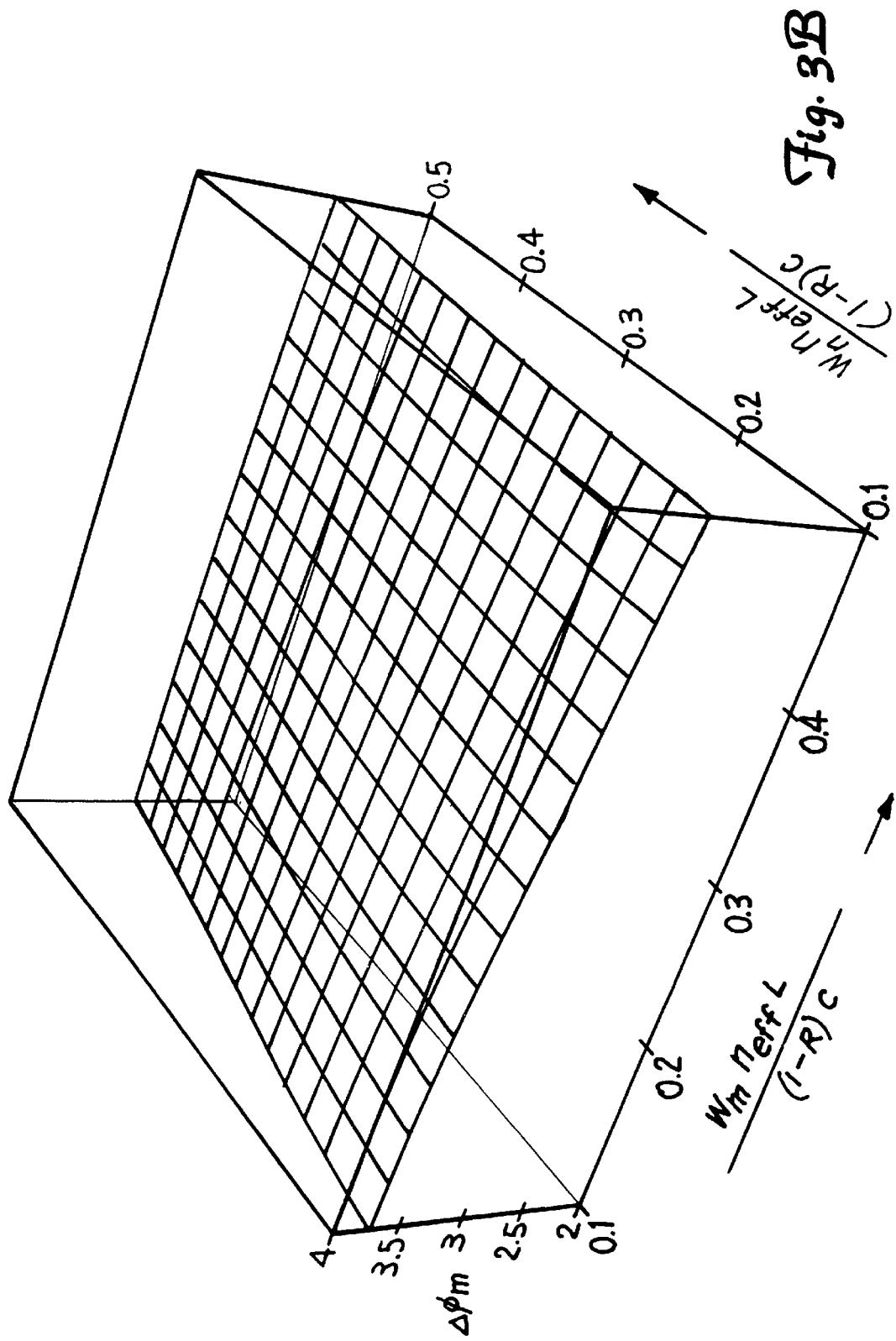

Examples of such solutions for $\Delta\phi_n$ and $\Delta\phi_m$ are shown in FIGS. 3A and 3B, respectively, for an arbitrary choice of R, that being R=0.936. Each choice of values for $\omega_n$ and $\omega_m$ results in a corresponding point on each of the surfaces shown in FIGS. 3A and 3B to provide values for $\Delta\phi_n$ and $\Delta\phi_m$. In these figures, the modulation frequencies $\omega_n$ and $\omega_m$ are each presented in normalized form, $\omega_n n_{eff}L/(1-R)c$ and $\omega_m n_{eff}L/(1-R)c$, respectively, along the horizontal axes of the graphs shown therein relating them to the resonance linewidth of resonator coil 10.

Stated alternatively, these normalized modulation frequencies represent the ratio of the modulation frequencies $f_n$ and $f_m$ to the frequency difference between the center of the resonance in the frequency spectrum and the frequency at which half power occurs with respect to the peak power in the same resonance (i.e., half-width, half-maximum frequency). These normalized frequencies, multiplied by the corresponding values of $\Delta\phi_n$ and $\Delta\phi_m$, are a measure of the modulation excursion relative to the resonance width. Since many of the equations presented above are based in part on approximations assuming small modulation excursions, they become increasingly more exact for decreasing modulation amplitudes.

Even though the last two equations are good approximations for the normalized frquencies having values below 0.1, the corresponding solutions have not been shown in FIGS. 3A and 3B because of space limitations. Nevertheless, such solution values could be shown as valid solutions.

Solutions shown for the larger values of the normalized frequencies chosen to be presented in the graphs of FIGS. 3A and 3B are actual solutions to the last two equations, but may be less representative of the actual values of $\Delta\phi_n$ and $\Delta\phi_m$ which should be used to reduce backscattering errors at those frequencies because the equations do not as accurately represent the system of FIG. 2 at those frequencies due to the approximations used in deriving them. Nevertheless, studies of the actual operation of systems similar to that of FIG. 2 indicate that values for $\Delta\phi_n$ and $\Delta\phi_m$ in the neighborhood of those shown in the figures do exist at which backscattering errors are similarly reduced. Of course, these values could be found using a more accurate mathematical model for the system of FIG. 2 avoiding all or many of the approximations used above, but the solutions most likely would have to be found using numerical methods on a digital computer.

As FIGS. 3A and 3B show, lower modulation frequencies lead to solutions approaching $\Delta\phi_n \approx 3.8 \approx \Delta\phi_m$. Such values for $\Delta\phi_n$ and $\Delta\phi_m$, in turn, lead to $J_1(\Delta\phi_n)$ and $J_1(\Delta\phi_m)$ approaching zero in value. This follows because the Bessel functions $J_2(\omega_n n_{eff}\Delta\phi_n L/c)$ and $J_2(\omega_m n_{eff}\Delta\phi_m L/c)$ decrease rapidly for decreasing modulation frequencies so that the second terms in each of the last two equations approach zero in value leaving the first term also approaching a value of zero. From this initial situation, FIGS. 3A and 3B show that increasing values for modulation frequencies $\omega_n$ and $\omega_m$ results in the solutions for $\Delta\phi_n$ and $\Delta\phi_m$ decreasing in value from 3.8. Larger values of R give solutions for $\Delta\phi_n$ and $\Delta\phi_m$ which still tend toward 3.8 for sufficiently low values of modulation frequencies $\omega_n$ and $\omega_m$ but diverge more rapidly from that value $\omega_n$ and $\omega_m$ increase. On the other hand, lower values for R causes the solutions for $\Delta\phi_n$ and $\Delta\phi_m$ to depart from the value 3.8 more gradually for increasing values of $\omega_n$ and $\omega_m$.

Thus, setting $\Delta\phi_n$ and $\Delta\phi_m$ to the values indicated by the last two equations affords a further opportunity to suppress backscattering based errors alternate to the previously described possibilities of having $J_o(\Delta\phi_j)=0$, and of having $J_o(\Delta\phi_m)=0=J_o(\Delta\phi_n)$. At least for lower values of modulation frequencies $\omega_n$ and $\omega_m$, this last opportunity leads to use of higher values for $\Delta\phi_n$ and $\Delta\phi_m$ which reduces its attractiveness somewhat but still quite reasonably achievable through use of adjusters 60 and 61, and perhaps more convenient in some circumstances.

There are a number of variations of the implementation of the resonator fiber optic gyroscope system which differ from the core systems shown in FIGS. 1 and 2. However, the compensation arrangement added to the basic system of FIG. 1 in FIG. 2 can also, in essence, be used with such variants of the basic system shown in FIG. 1.

Figure 4:
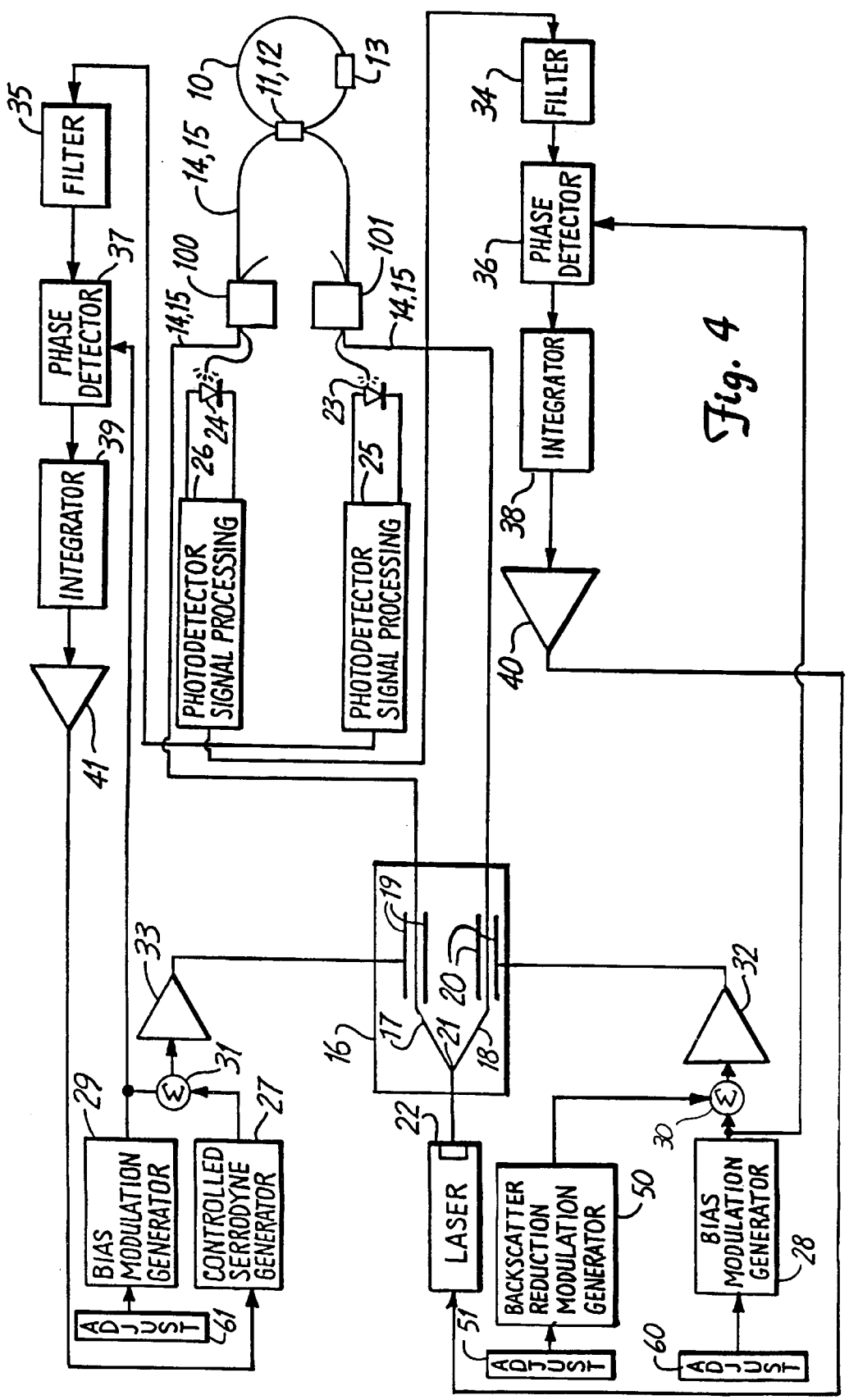
FIG. 4 shows a system schematic diagram of a further resonator fiber optical gyroscope system also embodying the present invention combining a signal processing arrangement and an optical transmission path and device arrangement.

For instance, the systems shown in FIGS. 1 and 2 are often termed "transmissive" resonator fiber optic gyroscope systems. A "reflective" resonator fiber optic gyroscope system is another alternative which is shown in FIG. 4, and in which the backscattering error is compensated by use of essentially the same compensation system.

The major difference in the "reflective" resonator fiber optic gyroscope system is that there is but a single coupler optically connecting resonator 10 with the remainder of the system. That is, a coupler designated 11,12 is shown in FIG. 4 which couples electromagnetic waves into resonator 10 from, and out of resonator 10 to, an external optical fiber designated 14,15, serving as both the input optical fiber and the output optical fiber for the system. This is possible because of the use of two further optical couplers, 100 and 101, which couple electromagnetic waves from external optical fiber 14,15 to photodetectors 24 and 23, respectively.

The outputs of these photodetectors are again provided to corresponding photodetector bias and signal processing circuits 26 and 25, respectively. Photodetector bias and signal processing circuits 26 and 25 then provide signals to the same kinds of feedback loop arrangements in FIG. 4 as similarly designated photodetector bias and signal processing circuits do in the system of FIG. 2.

The major difference in operation here is that the electromagnetic waves reaching photodetectors 23 and 24 are not only those waves which have been circulating in resonator 10 but also corresponding portions of the input electromagnetic waves which are not coupled into resonator 10 by optical coupler 11,12. Thus, there are two pairs of electromagnetic waves in external fiber 14,15 with each member of each pair following a different path than the other, and with each pair reaching a corresponding one of photodetectors 23 and 24. This leads to each pair member interfering with the other in that pair in impinging on the photodetector corresponding to that pair. That is, the electric field components of the electromagnetic waves reaching photodetector 23 can be represented as:

$$E_{d\text{-}23} = C_1 q E'_{in} + c_2 E_{ccw}$$

where $E_{d\text{-}23}$ represents the electric field component of the electromagnetic waves reaching photodetector 23, $qE'_{in}$ represents the input electromagnetic radiation provided through integrated waveguide 17, $E_{ccw}$ represents the counterclockwise electromagnetic waves which have been coupled back into external fiber 14,15 from resonator 10, and constants $c_1$ and $c_2$ represent the effects of various fractional couplings, losses, and phase delays on these electromagnetic wave components reaching photodetector 23.

Similarly, the electric field components of the electromagnetic waves reaching photodetector 24 can be represented as:

$$E_{d\text{-}24} = c_3 p E'_{in} + c_4 E_{cw}$$

with $E_{d\text{-}24}$ representing the electric field component of the electromagnetic waves reaching photodetector 24, $pE'_{in}$ representing the electromagnetic wave electric field component in external fiber 14,15 provided through integrated waveguide 18, $E_{cw}$ representing the clockwise traveling electromagnetic waves which have been coupled back into external optical fiber 14,15 from resonator 10, and constants $c_3$ and $c_4$ again representing various fractional couplings, losses and phase delays on these electromagnetic wave electric field components reaching photodetector 24.

Because the electric field components from two different optical paths in the electromagnetic waves reaching photodetectors 23 and 24 will interfere with each other upon arrival, the intensities at these detectors must be written as:

$$I_{d\text{-}23} = E_{d\text{-}23} \cdot E^*_{d\text{-}23} = |c_1 q E'_{in}|^2 + |c_2 E_{ccw}|^2 + 2|c_1 q E'_{in}||c_2 E_{ccw}| \cos \sigma_1$$

$$I_{d\text{-}24} = E_{d\text{-}24} \cdot E^*_{d\text{-}24} = |c_3 p E'_{in}|^2 + |c_4 E_{cw}|^2 + 2|c_3 p E'_{in}||c_4 E_{cw} \cos \sigma_2$$

with σ being the phase difference between the components of the electromagnetic waves from two paths reaching a corresponding photodetector. As a result, the equations characterizing the system of FIG. 4 will differ somewhat from the equations given previously characterizing the system of FIG. 2. In fact, the occurrence of resonance in resonator 10 leading to a peak in the electromagnetic energy therein at the frequency given such resonance will lead to a cancellation at the photodetectors in FIG. 4 so that resonance is represented by a null in the intensity impinging on those photodetectors. Nevertheless, an analysis of the system of FIG. 4 taking these differences into account will yield equations showing a similar result for the backscattering effect rotational rate error. Thus, a similar compensation arrangement can be used with the system of FIG. 4 as was used with the system of FIG. 2.

Although the present invention has been described with reference to preferred embodiments, workers skilled in the art will recognize that changes may be made in form and detail without departing from the spirit and scope of the invention.

What is claimed is:

1. An error reducer for reducing rotation rate errors arising because of electromagnetic wave backscattering in a coiled optical fiber in a rotation sensor capable of sensing rotation about an axis of said coiled optical fiber formed in a closed optical path in conjunction with at least a first coil coupler which is connected therewith such that electromagnetic waves can be coupled between said coiled optical fiber and a first external optical fiber, said rotation sensing based on having opposing electromagnetic waves propagating through said coiled optical fiber in opposing directions so as to result in each said opposing optical fiber electromagnetic wave impinging at least in part on a corresponding one of first and second photodetectors with one of said opposing coiled optical fiber electromagnetic waves propagating in one of said opposing directions being subject to having phasing thereof varied by selected signals supplied to a first input of a first phase modulator and with that other of said opposing coiled optical fiber electromagnetic waves propagating in that one of said opposing directions remaining being subject to having phasing thereof varied by selected signals supplied to a first input of a second phase modulator, said first photodetector providing an output signal in response to such impingement thereon of a corresponding said opposing coiled optical fiber electromagnetic wave which is representative of that wave, said error compensator comprising:

a first resonance determination signal generating means having an amplitude control input and an output electrically connected to said first phase modulator so as to be capable of providing a phase modulation component in a said opposing coiled optical fiber electromagnetic wave at a selected first resonance monitoring frequency, said first resonance determination signal generating means being further capable of adjusting values of amplitude of said phase modulation component provided thereby in accord with selected signals provided at said amplitude control input thereof;

a second resonance determination signal generating means having an amplitude control input and an output electrically connected to said second phase modulator so as to be capable of providing a phase modulation component in a said opposing coiled optical fiber electromagnetic wave at a selected second resonance monitoring frequency differing from said first resonance monitoring frequency, said second resonance determination signal generating means being further capable of adjusting values of amplitude of said phase modulation component provided thereby in accord with selected signals provided at said amplitude control input thereof;

a backscatter reduction signal generating means having an amplitude control input and an output electrically connected to a selected one of said first and second phase modulators so as to be capable of providing a phase modulation component in a selected one of said opposing coiled optical fiber electromagnetic waves at a selected backscatter reduction frequency, said backscatter reduction signal generating means being further capable of adjusting values of amplitude of said phase modulation component provided thereby in accord with selected signals provided at said amplitude control input thereof;

a first resonance determination amplitude control signal generator having an output electrically connected to a selected one of said first and second resonance determination signal generating means amplitude control inputs, said first resonance determination amplitude control signal generator being capable of providing at said output thereof a signal which directs that said one of said first and second resonance determination signal generating means to which said output thereof is electrically connected to provide a phase modulation component of an amplitude value which also would result in a substantial reduction in value of error components in said first photodetector signal; and a backscatter reduction amplitude control signal generator having an output electrically connected to said backscatter reduction signal generating means amplitude control input, said backscatter reduction amplitude control signal generator being capable of providing at said output thereof a signal which directs said backscatter reduction signal generating means to provide a phase modulation component of an amplitude value which would result in a substantial reduction in value of error components in said first photodetector signal.

2. The apparatus of claim 1 wherein said first external optical fiber is positioned with respect to said first phase modulator such that electromagnetic waves passing through at least a portion thereof also pass through said first phase modulator so as to be subject to having phases thereof varied in response to selected signals applied to said first phase modulator first input.

3. The apparatus of claim 1 further comprising a first signal component phase detection means having both a detection input electrically connected to said first photodetector to receive said first photodetector output signal, and a demodulation input, electrically connected to said first resonance determination signal generating means output, said first signal component phase detection means being capable of using signals supplied at said demodulation input thereof, having a substantial demodulation signal component therein at a selected demodulation frequency, to cause signals to appear at said output thereof representing amplitudes of components of signals occurring at said detection input thereof based on said demodulation frequency.

4. The apparatus of claim 1 further comprising a first controlled frequency adjustment signal generator means having a frequency adjustment input and having an output electrically connected to a phase modulator so as to be capable of providing a phase modulation component in a said opposing coiled optical fiber electromagnetic wave, said first controlled frequency adjustment signal generator means being capable of providing an output signal at said output thereof having a basic waveform repeated at a selected first shift operation frequency of a value selected based on signals appearing on said frequency adjustment input.

5. The apparatus of claim 2 wherein said first external optical fiber and said first phase modulator are part of a coiled optical fiber input means capable of having opposing electromagnetic waves, supplied from a common source of electromagnetic waves, propagate commonly through both of said first external optical fiber and said first phase modulator in opposite directions.

6. The apparatus of claim 2 wherein said coiled optical fiber is a single spatial mode optical fiber exhibiting birefringence so that differing indices of refraction occur along corresponding axes having an angular relationship with one another on cross sections of said optical fiber, and wherein said closed optical path including said coiled optical fiber has a transfer means therealong for transferring electromagnetic radiation propagating along one of said axes into propagating along another of said axes.

7. The apparatus of claim 2 wherein said coiled optical fiber is a single spatial mode optical fiber exhibiting birefringence so that differing indices of refraction occur along corresponding birefringence axes having an angular relationship with one another on cross sections of said optical fiber, and wherein said closed optical path including said coiled optical fiber has a polarizer therein having a transmission axis therein aligned with one of said birefringence axes of said coiled optical fiber and a blocking axis therein aligned with that one of said birefringence axes remaining.

8. The apparatus of claim 2 wherein said first external optical fiber has first and second output couplers connected therewith such that electromagnetic waves can be coupled between said first external optical fiber and a corresponding output optical path leading to a corresponding one of said first and second photodetectors.

9. The apparatus of claim 2 wherein said coiled optical fiber has a second coil coupler connected therewith such that electromagnetic waves can be coupled between said coiled optical fiber and a second external optical fiber, said second coil coupler having a pair of ends each positioned so that electromagnetic waves emanating therefrom impinge on a corresponding one of said first and second photodetectors.

10. The apparatus of claim 3 wherein said substantial reductions in values of error components in said first photodetector signal lead to corresponding reductions in values of error components in said first signal component phase detection means output signals, and wherein said first resonance determination amplitude control signal generator output signal has a value directing that said one of said first and second resonance determination signal generating means to which said output thereof is electrically connected to provide a phase modulation component of an amplitude value which, as an argument basis of a zeroth order Bessel function, results in that Bessel function having a value of substantially zero to thereby reduce values of error components in said first signal component phase detection means output signals, and wherein said backscatter reduction amplitude control signal generator output signal has a value directing said backscatter reduction signal generating means to provide a phase modulation component of an amplitude value which, as an argument basis of a zeroth order Bessel function, results in that Bessel function having a value of substantially zero to thereby also reduce values of error components in said first signal component phase detection means output signals.

11. The apparatus of claim 3 further comprising a second resonance determination amplitude control signal generator having an output electrically connected to that one remaining of said first and second resonance determination signal generating means amplitude control inputs, said second resonance determination amplitude control signal generator being capable of providing at said output thereof a signal which directs that said one of said first and second resonance determination signal generating means to which said output thereof is electrically connected to provide a phase modulation component of a selected amplitude value; and wherein said substantial reductions in values of error components in said first photodetector signal lead to corresponding reductions in values of error components in said first signal component phase detection means output signals, and wherein said first and second resonance determination amplitude control signal generators output signals have values directing that at least one of said first and second resonance determination signal generating means provide phase modulation components of amplitude values of approximately 3.8 with said first and second resonance determination signal generating means correspondingly providing said first and second resonance monitoring frequencies of sufficiently low values to thereby reduce values of error components in said first signal component phase detection means output signals, and wherein said backscatter reduction amplitude control signal generator output signal has a value directing said backscatter reduction signal generating means to provide a phase modulation component of an amplitude value which, as an argument basis of a zeroth order Bessel function, results in that Bessel function having a value of substantially zero to also thereby reduce values of error components in said first signal component phase detection means output signals.

12. The apparatus of claim 3 further comprising a second resonance determination amplitude control signal generator having an output electrically connected to that one remaining of said first and second resonance determination signal generating means amplitude control inputs, said second resonance determination amplitude control signal generator being capable of providing at said output thereof a signal which directs that said one of said first and second resonance determination signal generating means to which said output thereof is electrically connected to provide a phase modulation component of a selected amplitude value; and wherein said substantial reductions in values of error components in said first photodetector signal lead to corresponding reductions in values of error components in said first signal component phase detection means output signals, and wherein said first and second resonance determination amplitude control signal generators output signals have values directing that said first and second resonance determination signal generating means to provide phase modulation components of amplitude values to substantially satisfy $$J_1(\Delta\phi_n) - \frac{2R}{(1-R)^2}[J_2(\omega_n n_{eff}\Delta\phi_n L/c) + 2J_2(\omega_m n_{eff}\Delta\phi_m L/c)]J_3(\Delta\phi_n) = 0$$

to thereby reduce values of error components in said first signal component phase detection means output signals, and wherein said backscatter reduction amplitude control signal generator output signal has a value directing said backscatter reduction signal generating means to provide a phase modulation component of an amplitude value which, as an argument basis of a zeroth order Bessel function, results in that Bessel function having a value of substantially zero to also thereby reduce values of error components in said first signal component phase detection means output signals.

13. The apparatus of claim 4 wherein said first controlled frequency adjustment signal generator means has said output thereof electrically connected to said first phase modulator first input through a first resonance determination summing means having a first input electrically connected to said first controlled frequency adjustment signal generator means output, a second input electrically connected to said first resonance determination signal generating means output, and having an output electrically connected to said first phase modulator first input, said first resonant determination summing means being capable of combining selected signals provided at said first and second inputs thereof to provide an output signal on said output thereof based on such combined signals.

14. The apparatus of claim 4 further comprising a first supplementary phase modulator positioned with respect to said first phase modulator such that electromagnetic waves subject to having phases thereof varied in response to selected signals applied to said first phase modulator first input are also subject to having phases thereof varied in response to selected signals applied to a first input of said first supplementary phase modulator, said first controlled frequency adjustment signal generator means output being electrically connected to said first supplementary phase modulator first input.

15. The apparatus of claim 4 further comprising a signal component selection means having an input electrically connected to said first photodetector to receive said first photodetector output signal, and an output electrically connected to said first controlled frequency adjustment signal generator means frequency adjustment input, said first signal component selection means being capable of extracting a desired signal component from said photodetector output signal and providing an output signal based thereon at said output thereof.

16. The apparatus of claim 15 wherein a time integration means is electrically connected between said signal component selection means output and said first controlled amplitude adjustment signal generating means control input.

17. An error reducer for reducing rotation rate errors arising because of electromagnetic wave backscattering in a coiled optical fiber in a rotation sensor capable of sensing rotation about an axis of said coiled optical fiber formed in a closed optical path in conjunction with at least a first coil coupler which is connected therewith such that electromagnetic waves can be coupled between said coiled optical fiber and a first external optical fiber, said rotation sensing based on having opposing electromagnetic waves propagating through said coiled optical fiber in opposing directions so as to result in each said opposing optical fiber electromagnetic wave impinging at least in part on a corresponding one of first and second photodetectors with one of said opposing coiled optical fiber electromagnetic waves propagating in one of said opposing directions being subject to having phasing thereof varied by selected signals supplied to a first input of a first phase modulator and with that other of said opposing coiled optical fiber electromagnetic waves propagating in that one of said opposing directions remaining being subject to having phasing thereof varied by selected signals supplied to a first input of a second phase modulator, said first photodetector providing an output signal in response to such impingement thereon of a corresponding said opposing coiled optical fiber electromagnetic wave which is representative of that wave, said second photodetector providing an output signal in response to such impingement thereon of a corresponding said opposing coiled optical fiber electromagnetic wave which is representative of that wave, said error compensator comprising:

a first resonance determination signal generating means having an amplitude control input and an output electrically connected to said first phase modulator so as to be capable of providing a phase modulation component in a said opposing coiled optical fiber electromagnetic wave at a selected first resonance monitoring frequency, said first resonance determination signal generating means being further capable of adjusting values of amplitude of said phase modulation component provided thereby in accord with selected signals provided at said amplitude control input thereof;

a second resonance determination signal generating means having an amplitude control input and an output electrically connected to said second phase modulator so as to be capable of providing a phase modulation component in a said opposing coiled optical fiber electromagnetic wave at a selected second resonance monitoring frequency differing from said first resonance monitoring frequency, said second resonance determination signal generating means being further capable of adjusting values of amplitude of said phase modulation component provided thereby in accord with selected signals provided at said amplitude control input thereof;

a first resonance determination amplitude control signal generator having an output electrically connected to said first resonance determination signal generating means amplitude control input, said first resonance determination amplitude control signal generator being capable of providing at said output thereof a signal which directs said first resonance determination signal generating means to provide a phase modulation component of an amplitude value which also would result in a substantial reduction in value of error components in at least one of said first and second photodetector signals; and a second resonance determination amplitude control signal generator having an output electrically connected to said second resonance determination signal generating means amplitude control input, said second resonance determination amplitude control signal generator being capable of providing at said output thereof a signal which directs said second resonance determination signal generating means to provide a phase modulation component of an amplitude value which would result in a substantial reduction in value of error components in said first photodetector signal.

18. The apparatus of claim 17 wherein said first external optical fiber is positioned with respect to said first phase modulator such that electromagnetic waves passing through at least a portion thereof also pass through said first phase modulator so as to be subject to having phases thereof varied in response to selected signals applied to said first phase modulator first input.

19. The apparatus of claim 17 further comprising a first signal component phase detection means having both a detection input electrically connected to said first photodetector to receive said first photodetector output signal, and a demodulation input, electrically connected to said first resonance determination signal generating means output, said first signal component phase detection means being capable of using signals supplied at said demodulation input thereof, having a substantial demodulation signal component therein at a selected demodulation frequency, to cause signals to appear at said output thereof representing amplitudes of components of signals occurring at said detection input thereof based on said demodulation frequency.

20. The apparatus of claim 17 further comprising a first controlled frequency adjustment signal generator means having a frequency adjustment input and having an output electrically connected to a phase modulator so as to be capable of providing a phase modulation component in a said opposing coiled optical fiber electromagnetic wave, said first controlled frequency adjustment signal generator means being capable of providing an output signal at said output thereof having a basic waveform repeated at a selected first shift operation frequency of a value selected based on signals appearing on said frequency adjustment input.

21. The apparatus of claim 18 wherein said first external optical fiber and said first phase modulator are part of a coiled optical fiber input means capable of having opposing electromagnetic waves, supplied from a common source of electromagnetic waves, propagate commonly through both of said first external optical fiber and said first phase modulator in opposite directions.

22. The apparatus of claim 18 wherein said coiled optical fiber is a single spatial mode optical fiber exhibiting birefringence so that differing indices of refraction occur along corresponding axes having an angular relationship with one another on cross sections of said optical fiber, and wherein said closed optical path including said coiled optical fiber has a transfer means therealong for transferring electromagnetic radiation propagating along one of said axes into propagating along another of said axes.

23. The apparatus of claim 18 wherein said coiled optical fiber is a single spatial mode optical fiber exhibiting birefringence so that differing indices of refraction occur along corresponding birefringence axes having an angular relationship with one another on cross sections of said optical fiber, and wherein said closed optical path including said coiled optical fiber has a polarizer therein having a transmission axis therein aligned with one of said birefringence axes of said coiled optical fiber and a blocking axis therein aligned with that one of said birefringence axes remaining.

24. The apparatus of claim 18 wherein said first external optical fiber has first and second output couplers connected therewith such that electromagnetic waves can be coupled between said first external optical fiber and a corresponding output optical path leading to a corresponding one of said first and second photodetectors.

25. The apparatus of claim 18 wherein said coiled optical fiber has a second coil coupler connected therewith such that electromagnetic waves can be coupled between said coiled optical fiber and a second external optical fiber, said second coil coupler having a pair of ends each positioned so that electromagnetic waves emanating therefrom impinge on a corresponding one of said first and second photodetectors.

26. The apparatus of claim 19 wherein said substantial reductions in values of error components in said first photodetector signal lead to corresponding reductions in values of error components in said first signal component phase detection means output signals, and wherein said second resonance determination amplitude control signal generator output signal has a value directing said second resonance determination signal generating means to provide a phase modulation component of an amplitude value which, as an argument basis of a zeroth order Bessel function, results in that Bessel function having a value of substantially zero to thereby reduce values of error components in said first signal component phase detection means output signals.

27. The apparatus of claim 19 wherein said substantial reductions in values of error components in said first photodetector signal lead to corresponding reductions in values of error components in said first signal component phase detection means output signals, and wherein said first and second resonance determination amplitude control signal generators output signals have values directing that at least one of said first and second resonance determination signal generating means provide phase modulation components of amplitude values of approximately 3.8 with said first and second resonance determination signal generating means correspondingly providing said first and second resonance monitoring frequencies of sufficiently low values to thereby reduce values of error components in said first signal component phase detection means output signals.

28. The apparatus of claim 19 wherein said substantial reductions in values of error components in said first photodetector signal lead to corresponding reductions in values of error components in said first signal component phase detection means output signals, and wherein said first and second resonance determination amplitude control signal generators output signals have values directing that said first and second resonance determination signal generating means to provide phase modulation components of amplitude values to substantially satisfy $$J_1(\Delta\phi_n) - \frac{2R}{(1-R)^2}[J_2(\omega_n n_{eff}\Delta\phi_n L/c) + 2J_2(\omega_m n_{eff}\Delta\phi_m L/c)]J_3(\Delta\phi_n) = 0$$

to thereby reduce values of error components in said first signal component phase detection means output signals.

29. The apparatus of claim 20 wherein said first controlled frequency adjustment signal generator means has said output thereof electrically connected to said first phase modulator first input through a first resonance determination summing means having a first input electrically connected to said first controlled frequency adjustment signal generator means output, a second input electrically connected to said first resonance determination signal generating means output, and having an output electrically connected to said first phase modulator first input, said first resonant determination summing means being capable of combining selected signals provided at said first and second inputs thereof to provide an output signal on said output thereof based on such combined signals.

30. The apparatus of claim 20 further comprising a first supplementary phase modulator positioned with respect to said first phase modulator such that electromagnetic waves subject to having phases thereof varied in response to selected signals applied to said first phase modulator first input are also subject to having phases thereof varied in response to selected signals applied to a first input of said first supplementary phase modulator, said first controlled frequency adjustment signal generator means output being electrically connected to said first supplementary phase modulator first input.

31. The apparatus of claim 20 further comprising a signal component selection means having an input electrically connected to said first photodetector to receive said first photodetector output signal, and an output electrically connected to said first controlled frequency adjustment signal generator means frequency adjustment input, said first signal component selection means being capable of extracting a desired signal component from said photodetector output signal and providing an output signal based thereon at said output thereof.

32. The apparatus of claim 26 further comprising a second signal component phase detection means having both a detection input electrically connected to said second photodetector to receive said second photodetector output signal, and a demodulation input, electrically connected to said second resonance determination signal generating means output, said second signal component phase detection means being capable of using signals supplied at said demodulation input thereof, having a substantial demodulation signal component therein at a selected demodulation frequency, to cause signals to appear at said output thereof representing amplitudes of components of signals occurring at said detection input thereof based on said demodulation frequency.

33. The apparatus of claim 31 wherein a time integration means is electrically connected between said signal component selection means output and said first controlled amplitude adjustment signal generating means control input.

34. The apparatus of claim 32 wherein said substantial reductions in values of error components in said second photodetector signal lead to corresponding reductions in values of error components in said second signal component phase detection means output signals, and wherein said first resonance determination amplitude control signal generator output signal has a value directing said first resonance determination signal generating means to provide a phase modulation component of an amplitude value which, as an argument basis of a zeroth order Bessel function, results in that Bessel function having a value of substantially zero to thereby reduce values of error components in said second signal component phase detection means output signals.

* * * * *

UNITED STATES PATENT AND TRADEMARK OFFICE
CERTIFICATE OF CORRECTION

PATENT NO. : 6,014,217

DATED : January 11, 2000

INVENTOR(S) : Glen A. Sanders, Lee K. Strandjord, Nick A. Demma

It is certified that error appears in the above-identified patent and that said Letters Patent is hereby corrected as shown below:

On the title page: Item [75]

cancel "Mich." and substitute --Minn.-- for Nick Anthony Demma's residence.

Signed and Sealed this

Thirtieth Day of January, 2001

Attest:

Q. TODD DICKINSON

*Attesting Officer*  *Director of Patents and Trademarks*